United States Patent [19]

Yoshida et al.

[11] Patent Number: 5,739,263
[45] Date of Patent: Apr. 14, 1998

[54] FILM ADHESIVE AND PROCESS FOR PRODUCTION THEREOF

[75] Inventors: Tatsuhiro Yoshida; Yoshitaka Okugawa; Toshio Suzuki; Toshiro Takeda; Yushi Sakamoto; Takuya Tochimoto, all of Tokyo, Japan

[73] Assignee: Sumitomo Bakelite Company Limited, Tokyo, Japan

[21] Appl. No.: 182,194

[22] PCT Filed: Mar. 24, 1993

[86] PCT No.: PCT/JP93/00351

§ 371 Date: Jan. 28, 1994

§ 102(e) Date: Jan. 28, 1994

[87] PCT Pub. No.: WO93/24583

PCT Pub. Date: Dec. 9, 1993

[30] Foreign Application Priority Data

| Jun. 4, 1992 | [JP] | Japan | 04-144187 |
| Dec. 4, 1992 | [JP] | Japan | 04-325012 |
| Dec. 4, 1992 | [JP] | Japan | 04-325015 |
| Dec. 4, 1992 | [JP] | Japan | 04-325017 |
| Mar. 24, 1993 | [JP] | Japan | 04-144183 |

[51] Int. Cl.$^6$ ............ C08G 73/10; C08G 69/26
[52] U.S. Cl. ............ 528/353; 528/26; 528/28; 528/38; 528/125; 528/128; 528/170; 528/172; 528/173; 528/176; 528/183; 528/185; 528/188; 528/220; 528/229; 528/350; 526/935; 428/458; 428/473.5; 427/154; 427/155; 427/358; 427/240
[58] Field of Search ............ 528/38, 26, 28, 528/353, 128, 125, 170, 172, 173, 176, 183, 185, 188, 220, 229, 350; 427/154, 155, 358, 240; 428/473.5, 458; 526/935

[56] References Cited

U.S. PATENT DOCUMENTS

| 4,916,009 | 4/1990 | Hino et al. | 428/458 |
| 5,192,619 | 3/1993 | Konotsune et al. | 428/473.5 |
| 5,300,364 | 4/1994 | Hase et al. | 428/458 |
| 5,300,627 | 4/1994 | Kunimune et al. | 528/353 |
| 5,604,041 | 2/1997 | Choi | 427/154 |

FOREIGN PATENT DOCUMENTS

| 58-27721 | 2/1983 | Japan . |
| 58-44712 | 10/1983 | Japan . |
| 60-258229 | 12/1985 | Japan . |
| 61-143477 | 7/1986 | Japan . |
| 61-241359 | 10/1986 | Japan . |
| 61-247734 | 11/1986 | Japan . |
| 63-225629 | 9/1988 | Japan . |
| 64-42136 | 2/1989 | Japan . |
| 1188577 | 7/1989 | Japan . |
| 04334090 | 5/1991 | Japan . |
| 4-46983 | 2/1992 | Japan . |
| 4-50279 | 2/1992 | Japan . |
| 4-153224 | 5/1992 | Japan . |
| 4-318025 | 11/1992 | Japan . |
| 4-334089 | 11/1992 | Japan . |
| 4-334090 | 11/1992 | Japan . |

OTHER PUBLICATIONS

D. Wison et al, "Polymides", Chapman and Hall, 152–153, 1990, This is a book, No Month of Publication is Needed.

*Primary Examiner*—P. Hampton-Hightower
*Attorney, Agent, or Firm*—Browdy and Neimark

[57] ABSTRACT

The present invention provides a film adhesive comprising, as the main constituent, a polyimide resin having a glass transition temperature of 350° C. or lower and soluble in organic solvents, which polyimide resin is obtained by reacting at least one of the following acid components (A) and (B)

(A) 4,4'-oxydiphthalic acid dianhydride (B) 3,3',4,4'-biphenyltetracarboxylic acid dianhydride and/or 3,3',4,4'-benzophenonetetracarboxylic acid dianhydride with at least one of the following amine components (C) and (D)

(C) a siloxane compound represented by the following general formula (1) and/or 2,2-bis(4-(4-aminophenoxy)phenyl)propane

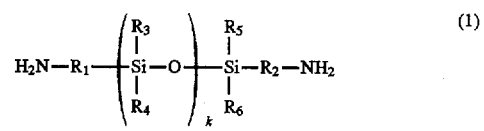

wherein $R_1$ and $R_2$ are each a bivalent aliphatic ($C_{1-4}$) or aromatic group; $R_3$, $R_4$, $R_5$ and $R_6$ are each a mono-valent aliphatic or aromatic group; and k is an integer of 1–20, (D) bis(aminophenoxy)benzene and/or dimethylphenylene-diamine to give rise to ring closure of imide, as well as a process for producing said film adhesive.

80 Claims, No Drawings

FILM ADHESIVE AND PROCESS FOR PRODUCTION THEREOF

TECHNICAL FIELD

The present invention relates to a polyimide film adhesive which has excellent heat resistance and low water absorption, which is suitable for use in electronics applications particularly as a material for mounting of semiconductors, which has excellent adhesion to silicon substrates and metals and which can be applied at low temperatures in a short period of time.

BACKGROUND ART

In recent years, while semiconductor chips have come to possess a higher function and a larger capacity and accordingly have become larger in size, the packages containing semiconductor chips are required to have an external form same as or even smaller than the conventional form so as to meet the demand for smaller electronic devices. In response to this trend, some new mounting methods allowing the high-density mounting of high-density semiconductor chips have been proposed. One is a LOC (lead-on-chip) structure proposed for memory devices, wherein a die pad-free lead frame and chips are fixed to each other with a double-coated adhesive tape. Meanwhile, in logic devices, a multi-layered lead frame structure has been proposed in which the electric source and the glands are provided in different frames and the metal plates for heat radiation are provided in a plurality of layers. While in the conventional methods, the chip area was too large to secure the area for inner leads, in the above new methods, semiconductor chips and a lead frame are bonded with a double-coated adhesive tape and can be accommodated in a package having the same external form as the conventional package although the chip area is larger due to the larger capacity of chips. In the new methods, it is possible to rationalize in-chip wiring and wire bonding, shorten the length of wire for quicker signal, radiate the heat generated by the higher consumption of electric power, and make smaller the size of a device.

In the devices employing the above new mounting methods, there exist various adhesion interfaces between same materials or between different materials, such as chip vs. lead frame, lead frame vs. plate, lead frame vs. lead frame and the like. Therefore, the reliability of a device is greatly influenced by the adhesion reliabilities of said interfaces. The adhesion reliabilities must withstand the temperatures employed during the assembling of a device and further must be sufficient when the device is under humidity or under humidity and heat. Further, adhesion workability is also an important item. In semiconductor apparatuses of COL or LOC structure, the semiconductor chips and the lead frame are fixed to each other with an adhesive. This adhesive is required to have an excellent adhesivity so that the adhesion interfaces do not cause peeling under humidity or under thermal stresses caused by reflow soldering, temperature cycle, etc. The presence of a large amount of volatile components in the adhesive is not preferable because, when it is applied with heating, the volatile components contaminate the working environment, leads, etc. Desirably, the adhesive can complete adhesion in a period of time as short as possible, in view of the mass productivity of a device.

As such an adhesive, there have heretofore been used paste-like adhesives and adhesives obtained by coating an adhesive on a heat-resistant base. As the adhesive, there are used thermosetting resins of epoxy resin type, acrylic resin type or rubber-phenolic resin type; however, they do not satisfy the requirements for a highly reliable adhesive, because they contain a large amount of ionic impurities, require a high temperature and a long time for thermosetting and are not productive, generate a large amount of volatile matters during thermosetting and contaminate leads, and are highly hygroscopic. Thus, no satisfactory adhesive has not yet been found.

Meanwhile, with respect to the heat-resistant film adhesive which is contact-bondable with heating, some film adhesives are known. For example, hot-melt adhesives of polyamideimide type or polyamide type are described in Japanese Patent Application Kokai (Laid-Open) No. 282283/1989; a process for producing a flexible printed circuit board using a polyimide type adhesive is described in Japanese Patent Application Kokai (Laid-Open) No. 157190/1983; and thermosetting polyimide type film adhesives are described in Japanese Patent Application Kokai (Laid-Open) Nos. 235382/1987, 235383/1987 and 15663/1990. However, the polyamide type or polyamide-imide type resins have a drawback of high water absorption owing to the hydrophilicity of the amide group, and have had a limitation in using them as an adhesive for electronics applications wherein reliability is required. The thermosetting polyimide type film adhesives require the conditions for contact bonding with heating, of 275° C., 50 kgf/cm$^2$ and 30 minutes, or must be cured from a semi-cured state at a high temperature for a long time, or generate condensation water during curing; therefore, they have been insufficient as an film adhesive for use in electronic parts which are sensitive to heat, pressure, water, etc. or in applications wherein mass productivity is required.

For the reasons mentioned above, it is desired to develop an adhesive suitable for the new mounting methods, particularly an adhesive tape from productivity standpoint.

Meanwhile, polyimide resins have high heat resistance, flame retardancy and excellent electrical insulating property and, accordingly, are in wide use in electric and electronic applications. However, conventional polyimide resins have high hygroscopicity and have no sufficient processability since they are insoluble and non-fusible or have very high melting points though they have excellent heat resistance. They are used as a material for mounting of semiconductors, in an insulating film between layers, a surface protective film, etc. In using them, a polyamic acid (a polyimide resin precursor) soluble in an organic solvent is coated on a semiconductor surface and the coated semiconductor is heated to remove the solvent and allow the imidization of the precursor to proceed. At that time, the acid amide type solvent used has a high boiling point and causes foaming of the resultant film; and a high-temperature (250° C. or higher) drying step is necessary to evaporate the solvent completely and the device is inevitably exposed to a high temperature. These matters incur reduction in yield in the assembling step. Moreover, the conventional polyimide resins have high hygroscopicity and have caused, in some cases, a problem that the water absorbed by them is vaporized all at once at high temperatures to cause bulging or cracking.

The present inventors made extensive study in order to obtain a polyimide film adhesive which can be applied at low temperatures in a short time, which has excellent heat resistance and which has low water absorption. As a result, the present inventors have found that a polyimide resin of particular structure achieves the above task, and have completed the present invention.

DISCLOSURE OF THE INVENTION

The present invention resides in a film adhesive comprising, as the main constituent, a polyimide resin having a glass transition temperature of 350° C. or lower and soluble in organic solvents, which polyimide resin is obtained by reacting at least one of the following acid components (A) and (B)

(A) 4,4'-oxydiphthalic acid dianhydride
(B) 3,3',4,4'-biphenyltetracarboxylic acid dianhydride and/or 3,3',4,4'-benzophenonetetracarboxylic acid dianhydride with at least one of the following amine components (C) and (D)

(C) a siloxane compound represented by the following general formula (1) and/or 2,2-bis(4-(4-aminophenoxy)phenyl)propane

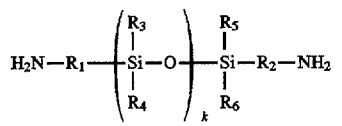

wherein $R_1$ and $R_2$ are each a bivalent aliphatic ($C_{1-4}$) or aromatic group; $R_3$, $R_4$, $R_5$ and $R_6$ are each a mono-valent aliphatic or aromatic group; and k is an integer of 1–20, (D) bis(aminophenoxy)benzene and/or dimethylphenylene-diamine to give rise to ring closure of imide.

The present invention resides also in a film adhesive according to the above, wherein the polyimide resin is capped, at the molecular ends, with an acid anhydride represented by the following general formula (2) or an aromatic amine represented by the following general formula (3):

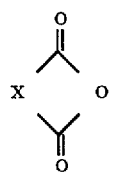

(X is at least one group selected from

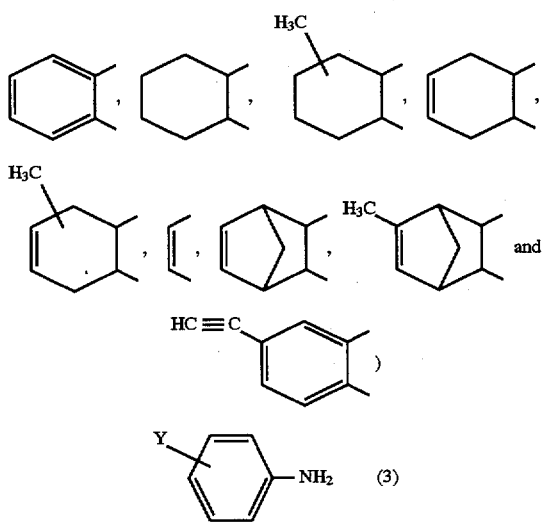

wherein Y is at least one group selected from hydrogen atom and methyl, ethyl, propyl, butyl, phenyl, methoxy, ethoxy, propoxy, butoxy and phenoxy groups.

The present invention resides also in a film adhesive according to the above, wherein the polyimide resin is composed by using, as the acid component (A), 4,4'-oxydiphthalic acid dianhydride in an amount of 60 mole % or more based on the total amount of the acid components.

The present invention resides also in a film adhesive according to the above, wherein the polyimide resin is composed by using, as the acid component (B), p moles of 3,3',4,4'-biphenyltetracarboxylic acid dianhydride and q moles of 3,3',4,4'-benzophenonetetracarboxylic acid dianhydride in proportions satisfying $0.5 \leq p/(p+q) \leq 0.9$.

The present invention resides also in a film adhesive according to the above, wherein the polyimide resin is composed by using, as the amine component (C), a siloxane compound represented by general formula (1) in an amount of 5–60 mole % based on the total amount of the amine components.

The present invention resides also in a film adhesive according to the above, wherein the polyimide resin is composed by using, as the amine component (D), 1,3-bis(3-aminophenoxy)benzene in an amount of 10–90 mole % based on the total amount of the amine components.

The present invention resides also in a film adhesive according to the above, wherein the polyimide resin is composed by using, as the acid components, a moles of 4,4'-oxydiphthalic acid dianhydride and b moles of another tetracarboxylic acid dianhydride and, as the amine components, c moles of $\alpha,\omega$-bis(3-aminopropyl)-polydimethylsiloxane, d moles of 1,3-bis(3-aminophenoxy) benzene and/or dimethylphenylenediamine and e moles of another diamine in proportions satisfying $a/(a+b) \geq 0.6$, $0.6 > b/(a+b) \geq 0$, $0.1 \leq c/(c+d+e) \leq 0.6$, $0.6 \leq (c+d)/(c+d+e)$, $0 \leq e/(c+d+e) < 0.6$ and $0.950 < (a+b)/(c+d+e) < 1.02$.

The present invention resides also in a film adhesive according to the above, wherein the polyimide resin is composed of, as the acid components, a moles of 4,4'-oxydiphthalic acid dianhydride and b moles of another tetracarboxylic acid dianhydride and, as the amine components, c moles of $\alpha,\omega$-bis(3-aminopropyl) polydimethylsiloxane, d moles of 1,3-bis(3-aminophenoxy) benzene and/or dimethylphenylenediamine and e moles of another diamine, and wherein the polyimide resin is capped, at the molecular ends, with f moles of an acid anhydride represented by general formula (2) or g moles of an aromatic amine represented by general formula (3), and wherein the molar ratios of a, b, c, d, e, f and g satisfy $0.6 \leq a/(a+b+0.5f)$, $0 \leq b/(a+b+0.5f) < 0.6$, $0.1 \leq c/(c+d+e+0.5g) \leq 0.6$, $0 \leq e/(c+d+e+0.5g) < 0.6$, $0.01 \leq f/(a+b+0.5f) \leq 0.05$ and $0.01 \leq g/(c+d+e+0.5g) \leq 0.05$ and either of f and g is 0.

The present invention resides also in a film adhesive according to the above, wherein the polyimide resin is composed by using, as the acid components, p moles of 3,3',4,4'-biphenyltetracarboxylic acid dianhydride and q moles of 3,3',4,4'-benzophenonetetracarboxylic acid dianhydride and, as the amine components, c' moles of 2,2-bis(4-(4-aminophenoxy)phenyl)propane and d moles of 1,3-bis(3-aminophenoxy)benzene in proportions satisfying $0.5 \leq p/(p+q) \leq 0.9$ and $0.1 \leq d/(c'+d) \leq 0.9$.

The present invention resides also in a film adhesive according to the above, wherein the polyimide resin is composed of, as the acid components, p moles of 3,3',4,4'-biphenyltetracarboxylic acid dianhydride and q moles of 3,3',4,4'-benzophenonetetracarboxylic acid dianhydride and, as the amine components, c' moles of 2,2-bis(4-(4-aminophenoxy)phenyl)propane and d moles of 1,3-bis(3-aminophenoxy)benzene, and wherein the polyimide resin is capped, at the molecular ends, with f moles of an acid anhydride represented by general formula (2) or g moles of an aromatic amine represented by general formula (3), and wherein the molar ratios of p, q, c', d, f and g satisfy $0.5 \leq p/(p+q+0.5f) \leq 0.9$, $0.1 \leq d/(c'+d+0.5g) \leq 0.9$, $0.01 \leq f/(p+q+0.5f) \leq 0.05$ and $0.01 \leq g/(c'+d+0.5g) \leq 0.05$ and either of f and g is 0.

The present invention resides also in a film adhesive according to the above, wherein the polyimide resin is composed by using, as the acid components, p moles of 3,3',4,4'-biphenyltetracarboxylic acid dianhydride and q moles of 3,3',4,4'-benzophenonetetracarboxylic acid dianhydride and, as the amine components, c moles of α,ω-bis(3-aminopropyl)polydimethylsiloxane, c' moles of 2,2-bis(4-(4-aminophenoxy)phenyl)propane and d moles of 1,3-bis(3-aminophenoxy)benzene and/or dimethylphenylenediamine so that the molar ratios of p, q, c, c' and d satisfy $0.5 \leq p/(p+q) \leq 0.9$, $0.1 \leq q/(p+q) \leq 0.5$ and $0.05 \leq c/(c+c'+d) \leq 0.5$.

The present invention resides also in a film adhesive according to the above, wherein the polyimide resin is composed of, as the acid components, p moles of 3,3',4,4'-biphenyltetracarboxylic acid dianhydride and q moles of 3,3',4,4'-benzophenonetetracarboxylic acid dianhydride and, as the amine components, c moles of α,ω-bis(3-aminopropyl)polydimethylsiloxane, c' moles of 2,2-bis(4-(4-aminophenoxy)phenyl)propane and d moles of 1,3-bis(3-aminophenoxy)benzene and/or dimethylphenylenediamine, and wherein the polyimide resin is capped, at the molecular ends, f moles of an acid anhydride represented by general formula (2) or g moles of an aromatic amine represented by general formula (3), and wherein the molar ratios of p, q, c, c', d, f and g satisfy $0.5 \leq p/(p+q+0.5f) \leq 0.9$, $0.1 \leq q/(p+q+0.5f) \leq 0.5$, $0.05 \leq c/(c+c'+d+0.5g) \leq 0.5$, $0.01 \leq f/(p+q+0.5f) \leq 0.05$ and $0.01 \leq g/(c+c'+d+0.5g) \leq 0.05$ and either of f and g is 0.

The present invention resides also in a film adhesive according to the above, wherein the polyimide resin is composed of, as the acid components, a moles of 4,4'-oxydiphthalic acid dianhydride and b moles of one or two tetracarboxylic acid dianhydrides selected from the group consisting of 3,3',4,4'-biphenyltetracarboxylic acid dianhydride and 3,3',4,4'-benzophenonetetracarboxylic acid dianhydride and, as the amine components, c moles of α,ω-bis(3-aminopropyl)polydimethylsiloxane, c' moles of 2,2-bis(4-(4-aminophenoxy)phenyl)propane and d moles of 1,3-bis(3-aminophenoxy)benzene and/or dimethylphenylenediamine so that the molar ratios of a, b c, c' and d satisfy $a/(a+b) \geq 0.6$, $b/(a+b) \leq 0.4$ and $0.05 \leq c/(c+c'+d) \leq 0.5$.

The present invention resides also in a film adhesive according to the above, wherein the polyimide resin is composed of, as the acid components, a moles of 4,4'-oxydiphthalic acid dianhydride and b moles of one or two tetracarboxylic acid dianhydrides selected from the group consisting of 3,3',4,4'-biphenyltetracarboxylic acid dianhydride and 3,3',4,4'-benzophenonetetracarboxylic acid dianhydride and, as the amine components, c moles of α,ω-bis(3-aminopropyl)polydimethylsiloxane, c' moles of 2,2-bis(4-(4-aminophenoxy)phenyl)propane and d moles of 1,3-bis(3-aminophenoxy)benzene and/or dimethylphenylenediamine, and wherein the polyimide resin is capped, at the molecular ends, with f moles of an acid anhydride represented by general formula (2) or g moles of an aromatic amine represented by general formula (3), and wherein the molar ratios of a, b, c, c', d, f and g satisfy $a/(a+b+0.5f) \geq 0.6$, $b/(a+b+0.5f) \leq 0.4$, $0.05 \leq c/(c+c'+d+0.5g) \leq 0.5$, $0.01 \leq f/(a+b+0.5f) \leq 0.05$ and $0.01 \leq g/(c+c'+d+0.5g) \leq 0.05$ and either of f and g is 0.

The present invention resides also in a film adhesive comprising a heat-resistant film base and the above polyimide resin applied on one side or both sides of the film base.

The present invention resides also in a film adhesive according to the above, wherein the heat-resistant film base is a polyimide film having a glass transition temperature of 350° C. or higher.

The present invention resides also in a process for producing a film adhesive, which comprises casting, on one side or both sides of a substrate, an organic solvent solution of the above polyimide resin.

The present invention resides also in a process for producing a film adhesive according to the above, wherein the substrate is a polyimide film having a glass transition temperature of 350° C. or higher.

The present invention resides also in a process for producing a film adhesive according to the above, which comprises casting an organic solvent solution of the polyimide resin on one side or both sides of a substrate, drying the cast solution and then peeling the substrate.

The present invention resides also in a process according to the above, wherein the substrate is a biaxially stretched polyester film.

The present invention resides also in a process for producing a film adhesive according to the above, which comprises casting the polyimide resin solution on a substrate by use of an organic solvent having a boiling point of 180° C. or lower, drying the cast polyimide resin solution and peeling the dried polyimide resin from the substrate.

DETAILED DESCRIPTION OF THE INVENTION 4,4'-Oxydiphthalic acid dianhydride used in obtaining the polyimide resin of the present invention is represented by formula (4); 3,3',4,4'-biphenyltetracarboxylic acid dianhydride is represented by formula (5); 3,3',4,4'-benzophenonetetracarboxylic acid dianhydride is represented by formula (6); 2,2-bis(4-(4-aminophenoxy)phenyl)propane is represented by formula (7); 1,3-bis(3-aminophenoxy)benzene, which is a typical example of bis(aminophenoxy)benzene, is represented by formula (8); 2,5-dimethyl-p-phenylenediamine, which is a typical example of dimethylphenylenediamine, is represented by formula (9); and α,ω-bis(3-aminopropyl)polydimethylsiloxane, which is a typical example of the siloxane compound of formula (1), is represented by formula (10). In formula (10), k is preferably in the range of 4–10 in view of the glass transition temperature, adhesion and heat resistance of the polyimide resin. These siloxane compounds can be used not only singly but also in combination of two or more. Use of, in particular, a blend of a siloxane compound of k=1 and a siloxane compound of k=4–10 is preferable for applications wherein adhesivity is very important.

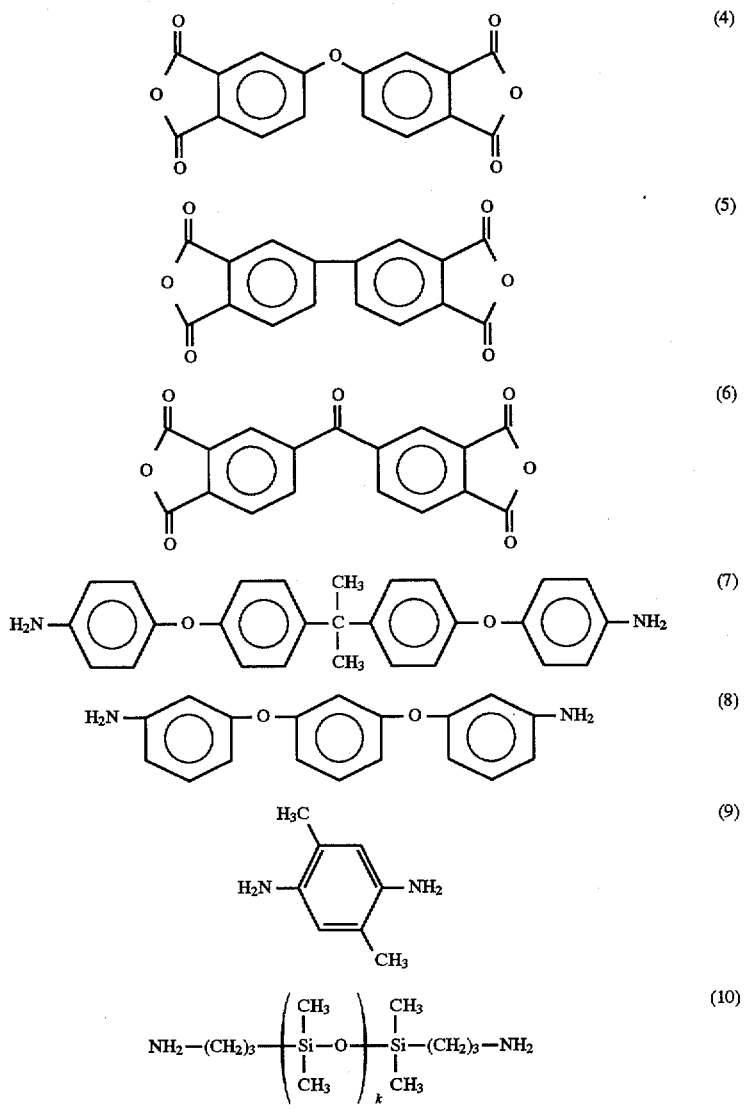

Bis(aminophenoxy)benzene is preferably 1,4-bis(3-aminophenoxy)benzene, 1,3-bis(3-aminophenoxy)benzene, 1,3-bis(4-aminophenoxy)benzene or the like. Dimethylphenylenediamine is preferably 2,5-dimethyl-p-phenylenediamine or 2,4-dimethyl-m-phenylenediamine.

It is important that the amount ratios of individual components be in the above-mentioned ranges. The molar proportion of 4,4'-oxydiphthalic acid dianhydride, which is an important constituent of the acid components, or the siloxane compound is very important for the solubility of the polyimide resin obtained and, when said molar proportion is not in the above range, a feature of the present invention of being soluble in low-boiling solvents is lost. In formula (1), k is preferably 1–10, more preferably 4–10, and mixed use of a monomer of k=4–10 and a monomer of k=1 is particularly preferable. The amount of the α,ω-bisaminosiloxane compound represented by formula (1) is preferably 5–60% based on the total amine components. An amount of 5% or less is not preferable because the polyimide resin obtained has lower solubility in organic solvents, higher water absorption and lower wettability on an adhered to be applied, which makes adhesion in a short time difficult. An amount more than 60% is not preferable because the polyimide resin obtained has a very low glass transition temperature and has inferior properties at high temperatures, which incurs insufficient heat resistance.

The molar proportion of 2,2-bis(4-(4-aminophenoxy)phenyl)propane is preferably in the range of 10–90 mole % based on the total amine components. When the proportion is outside the range, problems arise in solubility and heat resistance.

Addition of dimethylphenylenediamine can increase the heat resistance of the polyimide resin obtained, without reducing its solubility in low-boiling solvents. Further, 1,3-bis(3-aminophenoxy)benzene can be added when the polyimide resin obtained is required to have low-temperature adhesion in adhesive applications.

In the present invention, the tetracarboxylic acid dianhydrides as the acid components further include, besides those mentioned above, for example, 1,2,4,5-benzenetetracarboxylic acid dianhydride (PMDA), 2,2'-bis(4-(3,4-dicarboxyphenyl)phenyl)propane and 3,3',4,4'-diphenylsulfonetetracarboxylic acid dianhydride. One or more of these can be used together with the above-mentioned tetracarboxylic acid dianhydrides. Further, a dicarboxylic acid anhydride such as phthalic anhydride or the like can be added as a molecular weight modifier.

The tetracarboxylic acid dianhydride as an essential component is used in an amount of 50 mole % or more, preferably 70 mole % or more based on the total acid components. An amount of less than 50 mole % is not preferable because the polyimide resin obtained has a high glass transition temperature, which requires a very high temperature during adhesion, or has inferior adhesivity.

Similarly, the diamines include, besides the above-mentioned essential diamines, diamines such as 4,4'-diaminodiphenyl ether (4,4'-DDE), 3,3'-diaminodiphenyl ether (3,3'-DDE), 3,4'-diaminodiphenyl ether (3,4'-DDE), 4,4'-diaminodiphenyl sulfone (4,4'-DDS), 3,3'-diaminodiphenylsulfone (3,3'-DDS), 2,2-bis-4-aminophenylhexafluoropropane (BAPF), 2,2-bis-4-aminophenoxyphenylhexafluoropropane (BAPPF), bis-4-(4-aminophenoxy)phenylsulfone (BAPS), bis-4-(3-aminophenoxy)phenylsulfone (BAPSM), 4,4'-diaminobenzanilide (DABAN), m-phenylenediamine, p-phenylenediamine, 4,4'-diaminodiphenylmethane (DDM), 2,4-diaminotoluene and the like. One or more of these can be used together with the essential diamines. The diamine compound as an essential component is used in an amount of 50 mole % or more, preferably 70 mole % or more based on the total diamine components. Similarly to the case of the acid components, an amount of 50 mole % or less is not preferable because various drawbacks are brought about, for example, the polyimide resin obtained has a high glass transition temperature, which requires a very high temperature during adhesion, or has inferior adhesivity.

The polyimide resin, by being capped at the molecular ends to control the molecular weight, can have a melt viscosity suitable for adhesion to an adhered and can have higher wettability for higher adhesivity. The amount of the end-capping agent, i.e. the acid anhydride or the aromatic amine is desirably in the range of 1–5 mole %. An amount less than 1 mole % is not preferable because the resulting polyimide resin has too large a molecular weight and is insoluble in low-boiling solvents in some cases, and has inferior wettability caused by the increase in melt viscosity, in applications where adhesivity is very important. When said amount is more than 5 mole %, the polyimide resin has a significantly reduced molecular weight and has a problem in heat resistance.

As the end-capping agent, there can be cited an acid anhydride represented by general formula (2) and an aromatic amine represented by general formula (3).

As the acid anhydride, there are used phthalic anhydride, maleic anhydride, nadic anhydride, etc. and, as the aromatic amine, there are used p-methylaniline, p-methoxyaniline, p-phenoxyaniline, etc.

In the polycondensation reaction, the molar ratio of the tetracarboxylic acid dianhydride components and the diamine components is an important factor which determines the molecular weight of the polyamic acid obtained. It is well known that there is a correlation between the molecular weight of a polymer and its properties, particularly between the number-average molecular weight and the mechanical properties. A larger number-average molecular weight gives superior mechanical properties. Accordingly, a polymer is required to have an appropriately high molecular weight in order for the polymer to show an excellent strength when put into practical use as an adhesive. In the present invention, the equivalent ratio r of the acid anhydride components to the amine components is in the range of preferably $0.950 \leq r \leq 1.06$, more preferably $0.975 \leq r \leq 1.06$, wherein r=(equivalent number of total acid components)/(equivalent number of total amine components). When r is smaller than 0.950, the polyimide resin obtained has a small molecular weight, is fragile and therefore has low adhesivity. An r larger than 1.06 is not preferable because, in some cases, the unreacted carboxylic acids give rise to decarboxylation during heating and cause gas generation and foaming.

The reaction of the acid anhydrides and the amines is conducted in an aprotic polar solvent by a known method. The aprotic polar solvent is exemplified by N,N-dimethylformamide (DMF), N,N-dimethylacetamide (DMAC), N-methyl-2-pyrrolidone (NMP), tetrahydrofuran (THF), diglyme, cyclohexanone and 1,4-dioxane. The aprotic polar solvent may be used singly or as a mixture of two or more. At that time, a non-polar solvent compatible with the aprotic polar solvent may be used together with the aprotic polar solvent. An aromatic hydrocarbon such as toluene, xylene, solvent naphtha or the like is often used. The proportion of the non-polar solvent in the mixed solvent is preferably 30% by weight or less. The reason is that when the proportion of the non-polar solvent is 30% by weight or more, the mixed solvent has low solvency and may precipitate the polyamic acid formed. In the reaction of the tetracarboxylic acid dianhydrides with the diamines, sufficiently dried diamine components are dissolved in the above-mentioned reaction solvent which is dehydrated and purified; thereto are added sufficiently dried tetracarboxylic acid dianhydrides having a ring closure ratio of 98%, preferably 99% or higher to allow the reaction to proceed.

The thus-obtained polyamic acid solution is then heated in an organic solvent to give rise to dehydration, cyclization and resultantly imidization for formation of a polyimide. The water generated by the imidization reaction hinders the ring-closing reaction; therefore, an organic solvent non-compatible with water is added to the system and azeotropic distillation is conducted using an apparatus such as Dean-Stark tube or the like, to discharge the water out of the system. Dichlorobenzene is known as the organic solvent non-compatible with water, but it may invite the presence of chlorine in the polyimide resin obtained. Hence, when the polyimide resin obtained is used in electronics applications, the above-mentioned aromatic hydrocarbon is used preferably. Further, it is possible to use, as a catalyst for imidization reaction, a compound such as acetic anhydride, β-picoline, pyridine or the like.

In the present invention, the degree of ring closure of imide is desired to be as high as possible. A low imidization degree is not preferable because, during adhesion, the heat generated gives rise to further imidization and consequently generates water. Desirably, an imidization degree of 95% or more, preferably 98% or more is achieved during the imidization.

In the imidization, if strong heating is conducted from the start before a polyimide film is formed, there is formed a rough surface or a partially stretched surface; therefore, it is preferable that heating be started at a low temperature and the temperature be increased slowly. For example, heating is conducted continuously from 100° C. to 350° C. in 0.5 hour or more. When the heating time is less than 0.5 hour, solvent removal becomes insufficient and ring closure of imide becomes insufficient and resultantly the polyimide resin obtained has no sufficient properties, although these matters vary depending upon the film thickness of the polyimide resin obtained. Alternatively, the temperature elevation may be conducted stepwise by conducting heating, for example, at 100° C. for 30 minutes, then at 150° C. for 30 minutes, at 200° C. for 30 minutes, at 250° C. for 30 minutes, at 300° C. for 30 minutes and at 350° C. for 30 minutes.

In the present invention, the thus-obtained polyimide solution is not coated on a substrate as it but is added to a poor solvent to reprecipitate the polyimide resin for removal of unreacted monomers and purification. The polyimide resin after purification, filtration and drying is redissolved in an organic solvent to prepare a varnish. As the solvent, there is selected a solvent having a boiling point of 180° C. or below in order to minimize the residual solvent in the film to be prepared and also in view of the economy and workability of the coating and drying steps of the varnish. In the present invention, there can be used, as ketone type solvents, acetone (b.p.: 56.5° C.), methyl ethyl ketone (b.p.: 79.6° C.), methyl isobutyl ketone (b.p.: 118° C.), cyclopentanone (b.p.: 130.6° C.) and cyclohexanone (b.p.: 155.6° C.) and, as ether type solvents, 1,4-dioxane (b.p.: 101.1° C.), tetrahydrofuran (b.p.: 66° C.) and diglyme (b.p.: 162° C.). These solvents may be used singly or in admixture of two or more. N,N-dimethylformamide and N,N-dimethylacetamide, both of which are amide type solvents, have boiling points of 180° C. or below, respectively. They, however, are not preferable because they have high interaction with the polyimide resin and gives a low evaporation rate and accordingly, unless drying is conducted at 200° C. or above, it is difficult to remove the solvent molecules which are in solvation with the polyimide resin, and the solvent remains in the polyimide film in a large amount. Said solvents are not preferable, either, because they are highly hygroscopic and, when the polyimide varnish containing them is made into a film by coating, the film tends to absorb water and cause whitening. In the present invention, the residual solvent content in the film can be controlled at a low level, as compared with those in conventional polyimide films obtained by heating a polyamic acid dissolved in a high-boiling polar solvent (e.g. NMP) at the time of film formation to give rise to imidization, and further the contamination of an adhered by the thermal decomposition products of the polyimide resin can be prevented.

To the polyimide resin varnish can be added, if necessary, various additives for imparting surface smoothness, such as smoothing agent, levelling agent, defoamer, adhesion improver and the like. An aromatic hydrocarbon type solvent can also be added in such an amount that it is uniformly soluble, in order to control the evaporation rate of the solvent in the polyimide resin varnish.

In order to use the polyimide resin varnish as a film adhesive, the polyimide resin varnish is casted into a film shape and used as a film of polyimide resin alone or in one piece integrated with a film substrate.

In casting the polyimide resin varnish, there can be used, for example, an apparatus in which a coating device (e.g. flow coater or roll coater) and a hot-air drying chamber are combined. The polyimide resin varnish is coated on a substrate, and the coated substrate is introduced into a hot-air drying chamber and dried at a temperature and an air volume sufficient to evaporate the solvent in the varnish. As the substrate, there can be used thin metal plates of stainless steel, aluminum, copper, etc. as well as plastic films such as polyimide film, biaxially stretched polyester film and the like. Of them, a polyimide resin film is most preferable because it has a small thermal expansion coefficient, excellent dimensional stability to temperature change, high flexibility, easy handleability, high adhesion to the adhesive resin of the present invention, etc. In particular, a film made of a polyimide resin having a structure represented by formula (11) or (12) is preferable.

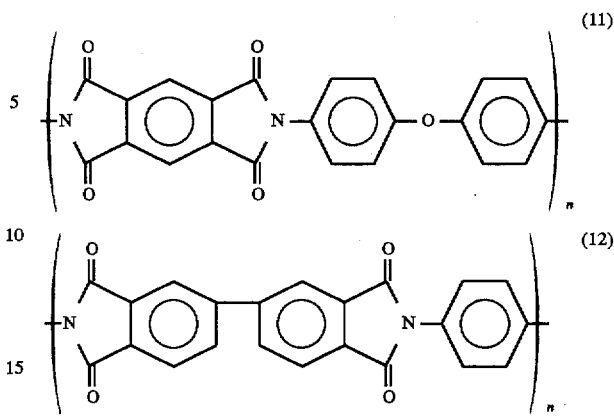

When the polyimide resin is used as a film adhesive by itself, the polyimide resin film formed on a substrate is peeled off from the substrate and used. When the polyimide resin is used as one-piece adhesive integrated with a substrate, the polyimide resin film formed on one or both sides of a substrate is used as such.

The present invention can also be used as an adhesive of two-layer or three-layer structure when the above substrate itself is used as a base. In that case, a polyimide film can be used advantageously as the substrate. However, in order for the adhesive of the present invention to sufficiently exhibit the characteristics of low water absorption and low ionic impurities content, the present adhesive preferably comprises only the polyimide resin of the present invention and contains neither substrate nor base. In a case where the polyimide resin is combined with a solvent having a boiling point of 180° C. or below and a polyester film, no releasing agent (this agent is required when a metal substrate is used) is required and the polyimide resin can be easily peeled off from the polyester film. No use of a releasing agent (this agent hinders the adhesion property of the polyimide resin) is very advantageous in the production of a film adhesive, is most suited for the object of the present invention, and enables the best use of the heat resistance and high reliability of the polyimide.

How to use the polyimide adhesive of the present invention is not particularly restricted. It can be used as a film adhesive which can be contact-bonded with heating. That is, it is cut into a desired shape and contact-bonded with heating, using a heated heat block.

The film adhesive of the present invention is characterized by using, as a main constituent, a completely imidized polyimide resin of particular structure soluble in low-boiling organic solvents. The polyimide resin as an adhesive can have a very low ionic-impurities level by being reprecipitated and purified, generates substantially no gas when heated because the imidization is conducted using a low-boiling solvent, has low water absorption and excellent heat resistance, and can be applied in a very short time as compared with thermosetting adhesives which give rise to a chemical reaction. The present invention, by being processed into a tape shape, can have excellent adhesion workability and excellent dimensional precision to bonded portions.

BEST MODE FOR CARRYING OUT THE INVENTION

The present invention is hereinafter described in more detail by way of Examples and Comparative Examples.

However, the present invention is in no way restricted to these Examples.

Example 1

1,170 g of dehydrated and purified NMP and 130 g of xylene were placed in a four-necked flask equipped with an inlet tube for dried nitrogen gas, a cooler with a calcium chloride drying tube, a thermometer and a stirrer, and were vigorously stirred for 10 minutes with nitrogen gas being passed therethrough. Then, thereto were added 73.08 g (0.25 mole) of 2,2-bis(4-(4-aminophenoxy)phenyl)propane and 102.63 g (0.25 mole) of 1,3-bis(3-aminophenoxy)benzene. The system was heated to 60° C. and stirred until it became uniform. After the system became a uniform solution, it was cooled to 5° C. in an ice water bath. Thereto were added, in 15 minutes, 101.43 g (0.345 mole) of 3,3',4,4'-biphenyltetracarboxylic acid dianhydride and 47.61 g (0.148 mole) of 3,3',4,4'-benzophenonetetracarboxylic acid dianhydride both of powder form. Thereafter, stirring was continued for 3 hours. During the stirring, the flask was kept at 5° C.

The thus-prepared polyamic acid solution was coated on a polyimide film (UPILEX S manufactured by Ube Industries, Ltd.) having a thickness of 50 µm. The coated polyimide film was subjected to a heating treatment in a circulating hot air dryer at 120° C. for 1 hour, at 200° C. for 1 hour and at 300° C. for 1 hour. After cooling, the film was measured for thickness and the thickness of the formed adhesive layer was calculated. The adhesive layer had a thickness of 22 µm. The adhesion surface of the film showed no adhesiveness and was tack-free at room temperature.

This adhesive film was cut into a size of 25 mm×50 mm to prepare an adhesive tape. The adhesive tape was bonded to the metal luster surface of a 35-µm electrolytic copper foil, using a hot press having a heat block made of phosphor bronze, whereby a test piece was prepared. The adhesion conditions were 310° C. and 20 seconds and the pressure applied onto the adhesion surface was 7 kg/cm² as a result of calculation from the gauge pressure and the adhesion area. The test piece had a 180° peeling strength of 1.50 kgf/cm.

Further, the 180° peeling strength after 168-hour treatment in an environment of 85° C. and 85% was 1.39 kgf/cm. Thus, the adhesion surface of the film showed excellent adhesivity to copper. On the rupture surface, the adhesive resin layer caused cohesive failure, which indicated the excellent adhesivity of the adhesive resin layer to the base (polyimide film). The results are shown in Table 1.

Example 2 and Comparative Examples 1–3

Adhesive tapes were obtained in the same manner as in Example 1 under the conditions shown in Table 1 and Table 2. The properties of these adhesive tapes are shown in Table 1 and Table 2.

TABLE 1

|  | Example 1 | Example 2 |
| --- | --- | --- |
| Adhesive resin | Figures in parentheses indicate molar ratios | |
| Amine components | APB (50) BAPP (50) | APB (50) BAPP (50) |
| Acid components | BPDA (70) BTDA (30) | ODPA (100) |
| Acid/amine molar ratio | 0.985 | 0.990 |
| Glass transition temperature | 220° C. | 176° C. |
| Thermal decomposition temperature | 533° C. | 562° C. |
| Linear expansion coefficient | 5.0 ppm | 7.4 ppm |
| Adhesive layer thickness | 22 µm | 17 µm |
| Heat-resistant base | UPILEX S 50 µm | UPILEX S 50 µm |
| Adhesion conditions | | |
| Temperature (°C.) | 310 | 260 |
| Time (seconds) | 20 | 10 |
| Pressure (kg/cm²) | 7 | 6 |
| Peeling strength | kgf/cm | |
| Ordinary state | 1.50 | 1.66 |
| HHBT-168 | 1.39 | 1.35 |
| Peeling interface | Cohesive failure | Cohesive failure |

TABLE 2

|  | Comparative Example 1 | Comparative Example 2 | Comparative Example 3 |
| --- | --- | --- | --- |
| Adhesive resin | Figures in parentheses indicate molar ratios | | |
| Amine components | 3,4'-DDE (30) 3,3'-DDA (70) | 4,4'-DDE (100) | 3,3'-DDS (100) |
| Acid components | BPDA (70) BTDA (30) | PMDA (100) | BPDA (100) |
| Acid/amine molar ratio | 0.985 | 0.975 | 0.985 |
| Glass transition temperature | 380° C. | >450° C. | 362° C. |
| Adhesive layer thickness | 19 µm | 20 µm | 18 µm |
| Heat-resistant base | UPILEX S 50 µm | UPILEX S 50 µm | UPILEX S 50 µm |
| Adhesion conditions | | | |
| Temperature (°C.) | 310 | 310 | 310 |
| Time (seconds) | 60 | 60 | 60 |
| Pressure (kg/cm²) | 8 | 8 | 8 |
| Peeling strength | kgf/cm | | |
| Ordinary state | 0.04 | <0.01 | <0.01 |
| HHBT-168 | <0.01 | | |
| Peeling interface | Peeled from copper surface | Peeled from copper surface | Peeled from copper surface |

As shown in Examples 1 and 2, the adhesives each using a polyimide resin composed of the essential components of the present invention show excellent adhesivity to copper and also to respective bases (polyimide films). Meanwhile, Comparative Examples 1–3 give very inferior adhesivity.

Example 3

989 g of dehydrated and purified NMP was placed in a four-necked flask equipped with an inlet tube for dried nitrogen gas, a cooler, a thermometer and a stirrer, and was vigorously stirred for 10 minutes with nitrogen gas being passed therethrough. Then, thereto were added 58.47 g (0.200 mole) of 1,3-bis(3-aminophenoxy)benzene and 116.00 g (average molecular weight: 870, 0.133 mole) of α,ω-bis(3-aminopropyl)polydimethylsiloxane. The system was heated to 60° C. and stirred until it became uniform. After the system became a uniform solution, it was cooled to 5° C. in an ice water bath. Thereto were added, in 15 minutes, 81.07 g (0.261 mole) of 4,4'-oxydiphthalic acid dianhydride and 19.22 g (0.065 mole) of 3,3',4,4'-biphenyltetracarboxylic acid dianhydride both of powder form. Thereafter, stirring was continued for 3 hours. During the stirring, the flask was kept at 5° C.

Then, the nitrogen gas inlet tube and the cooler were removed. A Dean-Stark tube filled with xylene was fitted to the flask and 109.9 g of xylene was added to the system. The system was heated to 200° C. in an oil bath and the water generated was removed out of the system. In 4 hours of heating, the generation of water from the system was not seen. After cooling, the reaction mixture was placed in a large amount of methanol to precipitate a polyimide resin. The solid was collected by filtration and vacuum-dried at 80° C. for 12 hours to remove the solvent. The resulting resin was measured for infrared absorption spectrum by a KBr tablet method, which gave an absorption at 5.6 μm by cyclic imide bond but no absorption at 6.06 μm by amide bond. Thus, it was confirmed that the resin was 100% imidized. 251.56 g (yield: 91.55%) of the thus-obtained polyimide resin was dissolved in cyclohexanone/toluene (90/10 w/w %) to prepare a polyimide resin varnish (resin content: 30%).

This polyimide resin varnish was coated on a polyimide film (UPILEX S manufactured by Ube Industries, Ltd.) having a thickness of 50 μm. The coated polyimide film was heat-dried in a circulating hot air dryer at 120° C. for 0.5 hour and at 200° C. for 1 hour. After cooling, the film was measured for thickness and the thickness of the formed adhesive layer was calculated. The adhesive layer had a thickness of 19 μm. The adhesion surface of the film showed no adhesiveness and was tack-free at room temperature.

This film adhesive was bonded to the metal luster surface of a 35-μm electrolytic copper foil, using a hot press having a heat block made of phosphor bronze, whereby a test piece was prepared. The adhesion conditions were such that contact bonding was conducted at 210° C. for 2 seconds and, after pressure release, annealing was conducted at 210° C. for 10 seconds. The pressure applied onto the adhesion surface was 4 kgf/cm$^2$ as a result of calculation from the gauge pressure and the adhesion area. The test piece had a 180° peeling strength of 2.81 kgf/cm. Further, the 180° peeling strength after 168-hour treatment in an environment of 85° C. and 85% was 2.66 kgf/cm. Thus, the adhesion surface of the film showed excellent adhesivity to copper. On the rupture surface, the adhesive resin layer caused cohesive failure and no foaming was seen. It indicated the excellent adhesivity of the adhesive resin layer to the base (polyimide film). There were also examined the adhesivities to a silicon wafer coated with a polyimide resin (SUMIRESIN EXCEL CRC-6061P manufactured by Sumitomo Bakelite Co., Ltd.). They were 2.01 kgf/cm and 1.75 kgf/cm, respectively. The results are shown in Table 3, together with other properties.

In the above, the molar ratios of the acids and the amines were a/(a+b)=0.8, c/(c+d+e)=0.4 and (c+d)/(c+d+e)=1, respectively.

Examples 4–7

Polyimide resin varnishes were prepared in the same manner as in Example 4 under the conditions shown in Table 3. They were coated on a polyimide film to prepare the respective film adhesives. Their properties are shown in Table 3.

TABLE 3

|  | Example 3 | Example 4 | Example 5 | Example 6 | Example 7 |
|---|---|---|---|---|---|
| Adhesive resin | Figures in parentheses indicate molar ratios | | | | |
| Amine components | APB (60) APPS (40) | APB (65) APPS (35) | APB (75) APPS (25) | APB (60) APPS (25) BAPP (15) | APB (65) APPS (45) |
| Acid components | ODPA (80) BPDA (20) | ODPA (70) BTDA (30) | ODPA (100) | ODPA (100) | ODPA (90) PMDA (10) |
| Acid/amine molar ratio | 0.980 | 0.985 | 0.995 | 0.995 | 0.985 |
| Glass transition temperature | 167° C. | 176° C. | 190° C. | 186° C. | 163° C. |
| Thermal decomposition temperature | 542° C. | 586° C. | 583° C. | 569° C. | 572° C. |
| Linear expansion coefficient | 6.3 ppm | 6.1 ppm | 3.4 ppm | 4.2 ppm | 8.3 ppm |
| Adhesive layer thickness | 19 μm | 21 μm | 20 μm | 20 μm | 19 μm |
| Heat-resistant base | UPILEX S 50 μm | UPILEX 50 μm | UPILEX S 50 μm | UPILEX S 50 μm | UPILEX S 50 μm |
| Adhesion conditions | | | | | |
| Temperature (°C.) | 210 | 210 | 210 | 210 | 240 |
| Time (seconds) | 20 | 25 | 10 | 10 | 10 |
| Pressure (kg/cm$^2$) | 4 | 4 | 4 | 4 | 6 |
| Peeling strength | kgf/cm | | | | |
| Ordinary state | 2.81 | 2.39 | 1.96 | 2.09 | 2.63 |
| HHBT-168 | 2.66 | 2.11 | 1.72 | 1.85 | 2.23 |
| Peeling interface | Cohesive failure | Cohesive failure | Cohesive failure | Cohesive failure | Cohesive failure |
| Ionic impurities | ppm | ppm | ppm | ppm | ppm |
| Cl$^-$ | 0.633 | 0.784 | 0.488 | 0.531 | 0.779 |
| HCOO$^-$ | 36.112 | 31.908 | 32.437 | 30.798 | 35.674 |
| (COO)$_2^-$ | 0.819 | Not detected | 0.977 | 0.774 | 0.859 |

TABLE 3-continued

|     | Example 3 | Example 4 | Example 5 | Example 6 | Example 7 |
|-----|-----------|-----------|-----------|-----------|-----------|
| $Na^+$ | 0.479 | 0.627 | 0.163 | 0.382 | 0.531 |
| $NH_4^+$ | 5.350 | 2.989 | 4.883 | 3.192 | 4.992 |

Example 8

1,3-Bis(3-aminophenoxy)benzene, 2,2-bis(4-(4-aminophenoxy)phenyl)propane, α,ω-bis(3-aminopropyl)polydimethylsiloxane (average molecular weight: 870), 3,3',4,4'-biphenyltetracarboxylic acid dianhydride and 4,4'-oxydiphthalic acid dianhydride were reacted in the same manner as in Example 1 at a molar ratio of 0.4/0.4/0.2/0.3/0.7, to obtain a polyimide resin. This polyimide resin was easily soluble in cyclohexanone and could be easily made into a polyimide resin film by using a polyester film as a substrate. The drying conditions were 120° C.×0.5 hour and then 160° C.×0.5 hour. The film had a glass transition temperature of 165° C., and was bonded to a copper foil at 240° C. in 30 seconds and showed a peeling strength of 1.77 kgf/cm. The film after adhesion gave no foaming. Incidentally, the gas generated in the film was measured under the same conditions as in Table 4 and was 204 ppm.

Example 9

The polyimide resin solution obtained in Example 8 was coated on a polyimide film (UPILEX S manufactured by Ube Industries, Ltd.) having a thickness of 50 μm, and a film adhesive was obtained in the same manner. This film had properties similar to those in Example 8.

Example 10

750 g of dehydrated and purified NMP was placed in a four-necked flask equipped with an inlet tube for dried nitrogen gas, a cooler, a thermometer and a stirrer, and was vigorously stirred for 10 minutes with nitrogen gas being passed therethrough. Then, thereto were added 73.0847 g (0.250 mole) of 1,3-bis(3-aminophenoxy)benzene (APB), 37.8163 g (average molecular weight: 840.36, 0.045 mole) of α,ω-bis(3-aminopropyl)polydimethylsiloxane (APPS) and 1.4971 g [0.006 mole, k=1 in formula (10)] of 1,3-bis(3-aminopropyl)tetramethyldisiloxane (APPS, k=1). The system was heated to 60° C. and stirred until it became uniform. After the system became a uniform solution, it was cooled to 5° C. in an ice water bath. Thereto was added, in 15 minutes, 93.4404 g (0.301 mole) of 4,4'-oxydiphthalic acid dianhydride (ODPA) of powder form. Thereafter, stirring was continued for 3 hours. During the stirring, the flask was kept at 5° C.

Then, the nitrogen gas inlet tube and the cooler were removed. A Dean-Stark tube filled with xylene was fitted to the flask and 187 g of toluene was added to the system. The system was heated to 175° C. in an oil bath and the water generated was removed out of the system. In 4 hours of heating, the generation of water from the system was not seen. After cooling, the reaction mixture was placed in a large amount of methanol to precipitate a polyimide resin. The solid was collected by filtration and vacuum-dried at 80° C. for 12 hours to remove the solvent, whereby 186.28 g (yield: 90.5%) of a solid resin was obtained. The resin was measured for infrared absorption spectrum by a KBr tablet method, which gave an absorption at 5.6 μm by cyclic imide bond but no absorption at 6.06 μm by amide bond. Thus, it was confirmed that the resin was nearly 100% imidized. Incidentally, the molar ratios of the acids and the amines were a/(a+b)=1, d/(c+d+e)=0.83 and e/(c+d+e)=0.17, respectively.

The thus-obtained polyimide resin was dissolved in cyclohexanone/toluene (90/10 w/w %) to prepare a polyimide resin varnish having a solid content of 25%. This varnish was coated on one side of a polyimide film [UPILEX SGA (trade name) manufactured by Ube Industries, Ltd.] having a thickness of 50 μm by use of a reverse roll coater to obtain a film adhesive in which the adhesive layer had a thickness of 30 μm. The drying temperature was 185° C. (maximum temperature) and the drying time was 6 minutes. This film adhesive was hot-pressed onto a 35 μm copper foil to prepare a test piece. The film adhesive was contact-bonded on the treated surface of the copper foil at 250° C. for 2 seconds and, after pressure release, annealing was conducted at 250° C. for 30 seconds. The pressure applied on the adhesion surface was 4 kgf/cm² as a result of calculation from the pressure gauge and the adhesion area. The test piece had a 180° peeling strength of 3.43 kgf/cm and showed excellent adhesivity. On the rupture surface, the adhesive resin caused cohesive failure and no foaming was seen. The results are shown in Table 4.

Example 11

The varnish of Example 10 was coated on a biaxially stretched polyester film [DIAFOIL (trade name) manufactured by Mitsubishi Rayon Co., Ltd.] having a thickness of 50 μm. The drying temperature was 185° C. (maximum temperature) and the drying time was 6 minutes. After drying, the polyester film was removed by peeling to obtain a single-layer film of 32 μm in thickness having no substrate. The peeling was easy and had no particular problem. The results when the film was bonded to the luster surface of a copper foil in the same manner as in Example 10, are shown in Table 4.

Examples 12–14

Reactions were conducted in the same manner as in Example 10, using the recipes shown in Table 4, to obtain soluble polyimide resins. Film adhesives were obtained using the polyimide resins. The results of evaluation for the film adhesives are shown in Table 4. Each of the film adhesives shows excellent properties.

TABLE 4

| Items | | Example 10 | Example 11 | Example 12 | Example 13 | Example 14 | Comparative Example 4 | Comparative Example 5 |
|---|---|---|---|---|---|---|---|---|
| Composition | | | | | | | | |
| Acid components | | | | | | | | |
| ODPA | | 100 | 100 | 80 | 100 | 80 | | PMDA 100 |
| BTDA | | | | 20 | | | 30 | |
| BPDA | | | | | | 20 | 70 | |
| Amine components | | | | | | | | |
| APB | | 83 | 83 | 60 | 15 | 45 | 30 | 65 |
| BAPP | | | | | 65 | 42 | | |
| BAPPF | | | | 20 | | | | |
| APPS (M = 870) | | 15 | 15 | 20 | 20 | 10 | 4,4'-DDE 70 | |
| APPS (k = 1) | | 2 | 2 | | | 3 | | 35 |
| Acid/amine equivalent ratio r | | 1.00 | 1.00 | 1.00 | 1.00 | 0.99 | 0.98 | 0.99 |
| Varnish solvent | | Cyclohexanone | Cyclohexanone | Dioxane | Cyclohexanone | Cyclohexanone | Insoluble | Insoluble |
| Film drying conditions | | | | | | | | |
| Maximum temperature (°C.) | | 180 | 180 | 170 | 180 | 180 | | |
| Time (min) | | 6 | 6 | 6 | 6 | 6 | | |
| Constitution | | | | | | | | |
| Base | | UPILEX | Not used | UPILEX | Not used | Not used | | |
| Thickness (µm) | | 50/30 | 32 | 20/50/20 | 25 | 25 | | |
| Properties | | | | | | | | |
| Conditions | Unit | | | | | | | |
| Water absorption | | | | | | | | |
| HH-168 treatment | % | 0.59 | 0.19 | 0.56 | 0.23 | 0.30 | | |
| Generated gas | | | | | | | | |
| GC-MS method | ppm | 95 | 81 | 78 | 101 | 96 | | |
| Generated water | | | | | | | | |
| Karl Fischer's method | % | 0.32 | 0.16 | 0.29 | 0.23 | 0.20 | | |
| Adhesion conditions | | | | | | | | |
| Temperature | °C. | 250 | 250 | 250 | 250 | 250 | | |
| Time | Seconds | 2/30 | 2/30 | 2/30 | 2/30 | 2/30 | | |
| Pressure | kgf/cm² | 4/0 | 4/0 | 4/0 | 4/0 | 4/0 | | |
| Adherend | | Copper | Copper | Copper | Copper | Copper | | |
| Peeling strength | | | | | | | | |
| 180° peeling | kgf/cm | 3.43 | 3.32 | 3.10 | 3.07 | 3.08 | | |

In Table 4, ODPA is an abbreviation of 4,4'-oxydiphthalic acid dianhydride; BTDA is an abbreviation of 4,4'-benzophenonetetracarboxylic acid dianhydride; BPDA is an abbreviation of 3,3',4,4'-biphenyltetracarboxylic acid dianhydride; APB is an abbreviation of 1,3-bis(3-aminophenoxy)benzene; BAPPF is an abbreviation of 2,2-bis(4-(4-aminophenoxy)phenyl)hexafluoropropane; and APPS is an abbreviation of α,ω-bis(3-aminopropyl)polydimethylsiloxane.

The figures in composition column each indicate an equivalent ratio of each component in acid or amine components; water absorption refers to the saturated water absorption of total film when the film was allowed to stand in an environment of 85° C. and 85% (relative humidity) for 168 hours (HH-168 treatment); generated gas refers to the amount measured by GC-MS method, of gas generated in total film when the film was heated at 250° C. for 15 minutes; and generated water refers to the amount measured by Karl Fischer method, of water generated in total film when the film was heated at 250° C. for 15 minutes.

Comparative Examples 4–5

Reactions were conducted in the same manner as in Example 10, using the recipes shown in Table 4, to obtain polyimide resins. Film adhesives were obtained using the polyimide resins. The results of evaluation for the film adhesives are shown in Table 4.

In Table 4, PMDA is an abbreviation of 1,2,4,5-benzenetetracarboxylic acid dianhydride; and 4,4'-DDE is an abbreviation of 4,4'-diaminodiphenyl ether, As is clear from the above Examples, the present invention enables production of a film adhesive having high heat resistance and low hygroscopicity,

Example 15

755 g of dehydrated and purified NMP was placed in a four-necked flask equipped with an inlet tube for dried nitrogen gas, a cooler, a thermometer and a stirrer, and was vigorously stirred for 10 minutes with nitrogen gas being passed therethrough. Then, thereto were added 100.4400 g (0.120 mole) of α,ω-bis(3-aminopropyl)polydimethylsiloxane (APPS), 77.9978 g (0.190 mole) of 2,2-bis(4-(4-aminophenoxy)phenyl)propane (BAPP) and 10.8957 g (0.080 mole) of 2,5-dimethyl-p-phenylenediamine (DPX). The system was heated to 60° C.

and stirred until it became uniform. After the system became a uniform solution, it was cooled to 5° C. in an ice water bath. Thereto were added, in 15 minutes, 74.4533 g (0.240 mole) of 4,4'-oxydiphthalic acid dianhydride and 47.0752 g (0.160 mole) of 3,3',4,4'-biphenyltetracarboxylic acid dianhydride both of powder form. Stirring was conducted for 1 hour, after which stirring was continued for 3 hours. During the stirring, the flask was kept at 5° C. Thereafter, 3.7046 g (0.020 mole) of p-phenoxyaniline (PPA) was added and stirring was continued for 1 hour.

Then, the nitrogen gas inlet tube and the cooler were removed. A Dean-Stark tube filled with xylene was fitted to the flask and 188 g of toluene was added to the system. The system was heated to 175° C. in an oil bath and the water generated was removed out of the system. In 4 hours of heating, the generation of water from the system was not seen. After cooling, the reaction mixture was placed in a large amount of methanol to precipitate a polyimide resin. The solid was collected by filtration and vacuum-dried at 80° C. for 12 hours to remove the solvent to obtain 284.99 g (yield: 90.6%) of a solid resin. The resin was measured for infrared absorption spectrum by a KBr tablet method, which gave an absorption at 5.6 μm by cyclic imide bond but no absorption at 6.06 μm by amide bond. Thus, it was confirmed that the resin was nearly 100% imidized.

The thus-obtained polyimide resin was dissolved in cyclohexanone/toluene (90/10 w/w %) to prepare a polyimide resin varnish having a solid content of 25%. This varnish was coated on one side of a polyimide film [UPILEX SGA (trade name) manufactured by Ube Industries, Ltd.] having a thickness of 50 μm, by use of a reverse roll coater to obtain an adhesive tape in which the adhesive layer had a thickness of 30 μm. The drying temperature was 185° C. (maximum temperature) and the drying time was 6 minutes. The adhesive tape was hot-pressed onto a 35 μm copper foil to prepare a test piece. The adhesive tape was contact-bonded on the treated surface of the copper foil at 250° C. for 2 seconds and, after pressure release, annealing was conducted at 250° C. for 30 seconds. The pressure applied onto the adhesion surface was 4 kgf/cm$^2$ as a result of calculation from the gauge pressure and the adhesion area. The test piece had a 180° peeling strength of 2.75 kgf/cm and showed excellent adhesivity. On the rupture surface, the adhesive resin layer caused cohesive failure and no foaming was seen. The results are shown in Table 5.

Example 16

The varnish of Example 15 was coated on a biaxially stretched polyester film [DIAFOIL (trade name) manufactured by Mitsubishi Rayon Co., Ltd.] having a thickness of 50 μm. The drying temperature was 185° C. (maximum temperature) and the drying time was 6 minutes. After drying, the polyester film was removed by peeling to obtain a single-layer film of 32 μm in thickness having no substrate. The peeling was easy and had no particular problem. The results when the film was bonded to the luster surface of a copper foil in the same manner as in Example 15, are shown in Table 5.

Examples 17–20

Soluble polyimide resins were obtained in the same manner as in Example 15, under the conditions shown in Table 5. The results of evaluation for these polyimide resins are shown in Table 5. Each of the adhesive tapes shows excellent properties.

TABLE 5

| Items | Example 15 | Example 16 | Example 17 | Example 18 | Example 19 | Example 20 |
|---|---|---|---|---|---|---|
| Composition | | | | | | |
| Acid components | | | | | | |
| ODPA | 60 | 60 | 80 | 80 | | 80 |
| PMDA | | | 17.5 | 17.5 | | |
| BPDA | 40 | 40 | | | 60 | |
| BTDA | | | | | 40 | 19 |
| PA | | | 5 | 5 | | 2 |
| Amine components | | | | | | |
| APPS | 30 | 30 | 40 | 40 | 25 | 20 |
| BAPP | 47.5 | 47.5 | 30 | 30 | 20 | 40 |
| APB | | | | | 53 | 20 |
| DPX | 20 | 20 | 30 | 30 | | 20 |
| PPA | 5 | 5 | | | 4 | |
| Acid/amine equivalent ratio r | 1.00 | 1.00 | 1.00 | 1.00 | 1.00 | 1.00 |
| Varnish solvent | Cyclohexanone | Cyclohexanone | Cyclohexanone | Cyclohexanone | Cyclohexanone | Cyclohexanone |
| Film drying conditions | | | | | | |
| Maximum temperature (°C.) | 180 | 180 | 180 | 180 | 180 | 180 |
| Time (min) | 6 | 6 | 6 | 6 | 6 | 6 |
| Tape constitution | | | | | | |
| Base | UPILEX | Not used | UPILEX | Not used | Not used | Not used |
| Thickness (μm) | 50/30 | 30 | 50/30 | 30 | 30 | 30 |
| Tape properties | | | | | | |
| Conditions Unit | | | | | | |
| Water absorption | | | | | | |
| HH-168 treatment  % | 0.65 | 0.31 | 0.58 | 0.26 | 0.26 | 0.34 |
| Generated gas | | | | | | |

TABLE 5-continued

| Items | | Example 15 | Example 16 | Example 17 | Example 18 | Example 19 | Example 20 |
|---|---|---|---|---|---|---|---|
| GC-MS method Generated water | ppm | 189 | 210 | 203 | 222 | 204 | 194 |
| Karl Fischer's method Adhesion conditions | % | 0.58 | 0.28 | 0.61 | 0.32 | 0.27 | 0.31 |
| Temperature | °C. | 250 | 250 | 250 | 250 | 250 | 250 |
| Time | Seconds | 2/30 | 2/30 | 2/30 | 2/30 | 2/30 | 2/30 |
| Pressure | kgf/cm$^2$ | 4/0 | 4/0 | 4/0 | 4/0 | 4/0 | 4/0 |
| Adherend | | Copper | Copper | Copper | Copper | Copper | Copper |
| Peeling strength | | | | | | | |
| 180° peeling | kgf/cm | 2.75 | 3.14 | 2.68 | 2.98 | 3.05 | 2.97 |

In Table 5, ODPA is an abbreviation of 4,4'-oxydiphthalic acid dianhydride; PMDA is an abbreviation of pyromellitic acid anhydride; PA is an abbreviation of phthalic anhydride; APPS is an abbreviation of α,ω-bis(3-aminopropyl) polydimethylsiloxane; BAPP is an abbreviation of 2,2-bis (4-(4-aminophenoxy)phenyl)propane; APB is an abbreviation of 1,3-bis(3-aminophenoxy)benzene; DPX is an abbreviation of 2,5-dimethyl-p-phenylenediamine; and PPA is an abbreviation of p-phenoxyaniline.

The figures in composition column each indicate an equivalent ratio of each component in acid or amine components; water absorption refers to the saturated water absorption of total film when the film was allowed to stand in an environment of 85° C. and 85% (relative humidity) for 168 hours (HH-168 treatment).

Comparative Examples 6–7

Polyimide resins were obtained in the same manner as in Example 15 under the conditions shown in Table 6. The results of evolution for the polyimide resins are shown in Table 6.

TABLE 6

| Items | | Comparative Example 6 | Comparative Example 7 |
|---|---|---|---|
| Composition Acid components | | | |
| ODPA | | | |
| PMDA | | | |
| BPDA | | 50 | 50 |
| BTDA | | 47.5 | 47.5 |
| PA | | 5 | 5 |
| Amine components | | | |
| APPS | | | |
| BAPP | | 100 | 100 |
| APB | | | |
| DPX | | | |
| PPA | | | |
| Acid/amine equivalent ratio r | | 1.00 | 1.00 |
| Varnish solvent | | NMP | NMP |
| Film drying conditions | | | |
| Maximum temperature (°C.) | | 250 | 200 |

TABLE 6-continued

| Items | | Comparative Example 6 | Comparative Example 7 |
|---|---|---|---|
| Time (min) | | 30 | 30 |
| Tape constitution | | | |
| Base | | UPILEX | Not used |
| Thickness (μm) | | 50/20 | 20 |
| Tape properties | | | |
| Conditions Water absorption | Unit | | |
| HH-168 treatment Generated gas | % | 1.15 | 0.87 |
| GC-MS method Generated water | ppm | 431 | 542 |
| Karl Fischer's method Adhesion conditions | % | 0.78 | 0.58 |
| Temperature | °C. | 250 | 250 |
| Time | Seconds | 2/30 | 2/30 |
| Pressure | kgf/cm$^2$ | 4/0 | 4/0 |
| Adherend | | Copper | Copper |
| Peeling strength | | | |
| 180° peeling | kgf/cm | 0.78 | (Foamed) |

As clear from the above Examples and Comparative Examples, the present invention enables production of a polyimide resin soluble in organic solvents and having high heat resistance and low hygroscopicity.

Examples 23–25

Soluble polyimide resins were obtained in the same manner as in Example 15, under the conditions shown in Table 7. The results of evaluation for these polyimide resins are shown in Table 7. Each of the adhesive tapes shows excellent properties.

TABLE 7

| Items | Example 23 | Example 25 |
|---|---|---|
| Composition | | |
| Acid components | | |
| ODPA | 80 | 100 |
| BPDA | | |
| BTDA | 19 | |
| PA | 2 | |
| Amine components | | |
| BAPP | 40 | 70 |
| APB | 20 | 15 |
| DPX | 20 | |
| APPS | 20 | 15 |
| PPA | | |
| Acid/amine equivalent ratio r | 1.00 | 1.00 |
| Varnish solvent | Cyclohexanone | Cyclohexanone |
| Film drying conditions | | |
| Maximum temperature (°C) | 180 | 180 |
| Time (min) | 6 | 6 |

| Items | | Example 21 | Example 22 | Example 23 | Example 24 | Example 25 |
|---|---|---|---|---|---|---|
| Tape constitution | | | | | | |
| Base | | UPILEX | Not used | UPILEX | Not used | Not used |
| Thickness (μm) | | 50/30 | 30 | 50/30 | 30 | 30 |
| Tape properties | | | | | | |
| Conditions | Unit | | | | | |
| Water absorption | | | | | | |
| HH-168 treatment | % | 0.65 | 0.31 | 0.59 | 0.34 | 0.25 |
| Generated gas | | | | | | |
| GC-MS method | ppm | 189 | 210 | 176 | 194 | 210 |
| Generated water | | | | | | |
| Karl Fischer's method | % | 0.58 | 0.28 | 0.47 | 0.31 | 0.29 |
| Adhesion conditions | | | | | | |
| Temperature | °C. | 250 | 250 | 250 | 250 | 250 |
| Time | Seconds | 2/30 | 2/30 | 2/30 | 2/30 | 2/30 |
| Pressure | kgf/cm$^2$ | 4/0 | 4/0 | 4/0 | 4/0 | 4/0 |
| Adherend | | Copper | Copper | Copper | Copper | Copper |
| Peeling strength | | | | | | |
| 180° peeling | kgf/cm | 2.75 | 3.14 | 2.83 | 2.97 | 2.70 |

In Table 7, ODPA is an abbreviation of 4,4'-oxydiphthalic acid dianhydride; BPDA is an abbreviation of 3,3',4,4'-biphenyltetracarboxylic acid dianhydride; BTDA is an abbreviation of 4,4'-benzophenonetetracarboxylic acid dianhydride; PA is an abbreviation of phthalic anhydride; BAPP is an abbreviation of 2,2-bis(4-(4-aminophenoxy)phenyl) propane; APB is an abbreviation of 1,3-bis(3-aminophenoxy)benzene; DPX is an abbreviation of 2,5-dimethyl-p-phenylenediamine; APPS is an abbreviation of α,ω-bis(3-aminopropyl)polydimethylsiloxane; and PPA is an abbreviation of p-phenoxyaniline.

The figures in composition column each indicate an equivalent ratio of each component in acid or amine components; water absorption refers to the saturated water absorption when the film was allowed to stand in an environment of 85° C. and 85% (relative humidity) for 168 hours (HH-168 treatment); generated gas refers to the amount measured by GC-MS method, of gas generated when the film was heated at 250° C. for 15 minutes; and generated water refers to the amount measured by Karl Fischer method, of water generated when the film was heated at 250° C. for 15 minutes. S in solubility column indicates "soluble in the relevant solvent".

Example 26

688 g of dehydrated and purified NMP was placed in a four-necked flask equipped with an inlet tube for dried nitrogen gas, a cooler, a thermometer and a stirrer, and was vigorously stirred for 10 minutes with nitrogen gas being passed therethrough. Then, thereto were added 65.6823 g (0.160 mole) of 2,2-bis(4-(4-aminophenoxy)phenyl)propane (BAPP), 23.3869 g (0.08 mole) of 1,3-bis(3-aminophenoxy) benzene (APB), 10.8957 g (0.080 mole) of dimethylphenylenediamine (DPX) and 66.9600 g (average molecular weight: 837, 0.080 mole) of α,ω-bis(3-aminopropyl) polydimethylsiloxane (APPS). The system was heated to 60° C. and stirred until it became uniform. After the system became a uniform solution, 2.3699 g (0.016 mole) of phthalic anhydride was added. The mixture was stirred for 1 hour. Then, the system was cooled to 5° C. in an ice water bath. Thereto were added, in 15 minutes, 91.7966 g (0.312 mole) of 3,3',4,4'-biphenyltetracarboxylic acid dianhydride and 25.7784 g (0.08 mole) of 3,3',4,4'-benzophenonetetracarboxylic acid dianhydride both of powder form. Then, stirring was continued for 3 hours.

Then, the nitrogen gas inlet tube and the cooler were removed. A Dean-Stark tube filled with xylene was fitted to the flask and 172 g of toluene was added to the system. The system was heated to 175° C. in an oil bath and the water generated was removed out of the system. In 4 hours of heating, the generation of water from the system was not seen. After cooling, the reaction mixture was placed in a large amount of methanol to precipitate a polyimide resin. The solid was collected by filtration and vacuum-dried at 80° C. for 12 hours to remove the solvent to obtain 257.32 g (yield: 89.7%) of a solid resin. The resin was measured for infrared absorption spectrum by a KBr tablet method, which gave an absorption at 5.6 μm by cyclic imide bond but no absorption at 6.06 μm by amide bond. Thus, it was confirmed that the resin was nearly 100% imidized. Incidentally, the molar ratios of the acid components and amine components were a/(a+b+0.5f)=0.78, b/(a+b+0.5f)=0.2 and e/(c+d+e)=0.2, respectively.

The thus-obtained polyimide resin was dissolved in cyclohexanone/toluene (90/10 w/w %) to prepare a polyimide resin varnish having a solid content of 25%. This varnish was coated on one side of a polyimide film [UPILEX SGA (trade name) manufactured by Ube Industries, Ltd.] having a thickness of 50 μm, by use of a reverse roll coater to obtain an adhesive tape in which the adhesive layer had a thickness of 30 μm. The drying temperature was 185° C. (maximum temperature) and the drying time was 6 minutes. The adhesive tape was hot-pressed onto a 35 μm copper foil to prepare a test piece. The adhesive tape was contact-bonded on the treated surface of the copper foil at 250° C. for 2 seconds and, after pressure release, annealing was conducted at 250° C. for 30 seconds. The pressure applied onto the adhesion surface was 4 kgf/cm$^2$ as a result of calculation from the gauge pressure and the adhesion area. The test piece had a 180° peeling strength of 3.12 kgf/cm and showed excellent adhesivity. On the rupture surface, the adhesive resin layer caused cohesive failure and no foaming was seen. The results are shown in Table 8.

Example 27

The varnish of Example 26 was coated on a biaxially stretched polyester film [DIAFOIL (trade name) manufactured by Mitsubishi Rayon Co., Ltd.] having a thickness of 50 μm. The drying temperature was 185° C. (maximum temperature) and the drying time was 6 minutes. After drying, the polyester film was removed by peeling to obtain a single-layer film of 30 μm in thickness having no substrate. The peeling was easy and had no particular problem. The results when the film was bonded to the luster surface of a copper foil in the same manner as in Example 26, are shown in Table 8.

Examples 28–30

Soluble polyimide resins were obtained in the same manner as in Example 26, under the conditions shown in Table 8. The results of evaluation for these polyimide resins are shown in Table 8. Each of the adhesive tapes shows excellent properties.

TABLE 8

| Items | | Example 26 | Example 27 | Example 28 | Example 29 | Example 30 |
|---|---|---|---|---|---|---|
| Composition | | | | | | |
| Acid components | | | | | | |
| BPDA | | 78 | 78 | 50 | 50 | 60 |
| BTDA | | 20 | 20 | 50 | 50 | 40 |
| PA | | 4 | 4 | | | |
| Amine components | | | | | | |
| BAPP | | 40 | 40 | 39 | 39 | 20 |
| APB | | 20 | 20 | | | 55 |
| DPX | | 20 | 20 | 30 | 30 | |
| APPS | | 20 | 20 | 30 | 30 | 25 |
| PPA | | | | 2 | 2 | |
| Acid/amine equivalent ratio r | | 1.00 | 1.00 | 1.00 | 1.00 | 1.00 |
| Varnish solvent | | Cyclohexanone | Cyclohexanone | Cyclohexanone | Cyclohexanone | Cyclohexanone |
| Film drying conditions | | | | | | |
| Maximum temperature (°C.) | | 180 | 180 | 180 | 180 | 180 |
| Time (min) | | 6 | 6 | 6 | 6 | 6 |
| Tape consitution | | | | | | |
| Base | | UPILEX | Not used | UPILEX | Not used | Not used |
| Thickness (μm) | | 50/30 | 30 | 50/30 | 30 | 30 |
| Tape properties | | | | | | |
| Conditions | Unit | | | | | |
| Water absorption | | | | | | |
| HH-168 treatment | % | 0.60 | 0.28 | 0.58 | 0.28 | 0.24 |
| Generated gas | | | | | | |
| GC-MS method | ppm | 225 | 240 | 202 | 238 | 212 |
| Generated water | | | | | | |
| Karl Fischer's method | % | 0.58 | 0.23 | 0.43 | 0.25 | 0.29 |
| Adhesion conditions | | | | | | |
| Temperature | °C. | 250 | 250 | 250 | 250 | 250 |
| Time | Seconds | 2/30 | 2/30 | 2/30 | 2/30 | 2/30 |

TABLE 8-continued

| Items | | Example 26 | Example 27 | Example 28 | Example 29 | Example 30 |
|---|---|---|---|---|---|---|
| Pressure | kgf/cm² | 4/0 | 4/0 | 4/0 | 4/0 | 4/0 |
| Adherend | | Copper | Copper | Copper | Copper | Copper |
| Peeling strength | | | | | | |
| 180° peeling | kgf/cm | 3.12 | 3.34 | 2.75 | 2.78 | 3.18 |

In Table 8, BPDA is an abbreviation of 3,3',4,4'-biphenyltetracarboxylic acid dianhydride; BTDA is an abbreviation of 4,4'-benzophenonetetracarboxylic acid dianhydride; PA is an abbreviation of phthalic anhydride; BAPP is an abbreviation of 2,2-bis(4-(4-aminophenoxy)phenyl) propane; APB is an abbreviation of 1,3-bis(3-aminophenoxy)benzene; DPX is an abbreviation of 2,5-dimethyl-p-phenylenediamine; APPS is an abbreviation of α,ω-bis(3-aminopropyl)polydimethylsiloxane; and PPA is an abbreviation of p-phenoxyaniline.

The figures in composition column each indicate an equivalent ratio of each component in acid or amine components; water absorption refers to the saturated water absorption of total film when the film was allowed to stand in an environment of 85° C. and 85% (relative humidity) for 168 hours (HH-168 treatment); generated gas refers to the amount measured by GC-MS method, of gas generated from total film when the film was heated at 250° C. for 15 minutes; and generated water refers to the amount measured by Karl Fischer method, of water generated from total film when the film was heated at 250° C. for 15 minutes.

INDUSTRIAL APPLICABILITY

The present invention can provide a film adhesive of high reliability having both heat resistance and adhesion workability. The present film adhesive provides an advantage particularly when copper, which is easily oxidized, is used as a lead frame, because the present film adhesive can be applied at low temperatures in a short time without incurring the oxidation of copper surface. Further, since the present film adhesive is soluble in low-boiling solvents, the residual solvent content in the film can be controlled at a very low level by using mild drying conditions as compared with the drying conditions used for conventional polyimides. Furthermore, since the present film adhesive is already imidized, no high-temperature step is required for imidization and no water is generated, during the application of the adhesive. Thus, the present film adhesive has features such as low water absorption, low impurities content, generation of very small amount of gas during heating, and the like; therefore, it has a very high industrial value as an electronics material in which high reliability and heat resistance are required, particularly as a material for mounting of semiconductors.

We claim:

1. A film adhesive comprising, as the main constituent, a polyimide resin having a glass transition temperature of 350° C. or lower and soluble in organic solvents, which polyimide resin is obtained by reacting at least one of the following acid components (A) and (B)

(A) 4,4'-oxydiphthalic acid dianhydride (B) 3,3',4,4'-biphenyltetracarboxylic acid dianhydride and/or 3,3',4,4'-benzophenonetetracarboxylic acid dianhydride with the following amine components (C) and (D)

(C) a siloxane compound represented by the following general formula (1) and/or 2,2-bis(4-(4-aminophenoxy)phenyl)propane

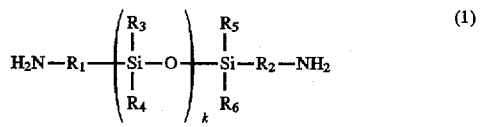

wherein $R_1$ and $R_2$ are each a bivalent aliphatic ($C_{1-4}$) or aromatic group; $R_3$, $R_4$, $R_5$ and $R_6$ are each a mono-valent aliphatic or aromatic group; and k is an integer of 1–20, (D) 1,3-bis(3-aminophenoxy)benzene and/or dimethylphenylene-diamine to give rise to ring closure of imide.

2. A film adhesive according to claim 1, wherein the polyimide resin is composed by using the acid component (A), i.e. 4,4'-oxydiphthalic acid dianhydride in an amount of 60 mole % or more based on the total amount of the acid components.

3. A film adhesive according to claim 1, wherein the polyimide resin is composed by using, as the acid component (B), p moles of 3,3',4,4'-biphenyltetracarboxylic acid dianhydride and q moles of 3,3',4,4'-benzophenonetetracarboxylic acid dianhydride in proportions satisfying $0.5 \leq p/(p+q) \leq 0.9$.

4. A film adhesive according to claim 1, wherein the polyimide resin is composed by using, as the amine component (C), a siloxane compound represented by general formula (1) in an amount of 5–60 mole % based on the total amount of the amine components.

5. A film adhesive according to claim 1, wherein the polyimide resin is composed by using, as the amine component (D), 1,3-bis(3-aminophenoxy)benzene in an amount of 10–90 mole % based on the total amount of the amine components.

6. A film adhesive according to claim 1, wherein the polyimide resin is composed by using, as the acid components, a moles of 4,4'-oxydiphthalic acid dianhydride and b moles of another tetracarboxylic acid dianhydride and, as the amine components, c moles of α,ω-bis(3-aminopropyl)polydimethylsiloxane, d moles of 1,3-bis(3-aminophenoxy)benzene and/or dimethylphenylenediamine and e moles of another diamine in proportions satisfying $a/(a+b) \geq 0.6$, $0.6 > b/(a+b) \geq 0$, $0.1 \leq c/(c+d+e) \leq 0.6$, $0.6 \leq (c+d)/(c+d+e)$, $0 \leq e/(c+d+e) < 0.6$ and $0.950 < (a+b)/(c+d+e) < 1.02$.

7. A film adhesive according to claim 1, wherein the polyimide resin is composed of, as the acid components, a moles of 4,4'-oxydiphthalic acid dianhydride and b moles of another tetracarboxylic acid dianhydride and, as the amine components, c moles of α,ω-bis(3-aminopropyl)polydimethylsiloxane, d moles of 1,3-bis(3-aminophenoxy) benzene and/or dimethylphenylenediamine and e moles of another diamine, and wherein the polyimide resin is capped, at the molecular ends, with f moles of an acid anhydride represented by general formula (2) or g moles of an aromatic amine represented by general formula (3), and wherein the molar ratios of a, b, c, d, e, f and g satisfy $0.6 \leq a/(a+b+0.5f)$, $0 \leq b/(a+b+0.5f) < 0.6$, $0.1 \leq c/(c+d+e+0.5g) \leq 0.6$, $0 \leq e/(c+d+e+0.5g) < 0.6$, $0.01 \leq f/(a+b+0.5f) \leq 0.05$ and $0.01 \leq g/(c+d+e+0.5g) \leq 0.05$ and either of f and g is 0.

8. A film adhesive according to claim 1, wherein the polyimide resin is composed by using, as the acid components, p moles of 3,3',4,4'-biphenyltetracarboxylic acid dianhydride and q moles of 3,3',4,4'-benzophenonetetracarboxylic acid dianhydride and, as the amine components, c' moles of 2,2-bis(4-(4-aminophenoxy)phenyl)propane and d moles of 1,3-bis(3-aminophenoxy)benzene in proportions satisfying $0.5 \leq p/(p+q) \leq 0.9$ and $0.1 \leq d/(c'+d) \leq 0.9$.

9. A film adhesive according to claim 1, wherein the polyimide resin is composed of, as the acid components, p moles of 3,3',4,4'-biphenyltetracarboxylic acid dianhydride and q moles of 3,3',4,4'-benzophenonetetracarboxylic acid dianhydride and, as the amine components, c' moles of 2,2-bis(4-(4-aminophenoxy)phenyl)propane and d moles of 1,3-bis(3-aminophenoxy)benzene, and wherein the polyimide resin is capped, at the molecular ends, with f moles of an acid anhydride represented by general formula (2) or g moles of an aromatic amine represented by general formula (3), and wherein the molar ratios of p, q, c', d, f and g satisfy $0.5 \leq p/(p+q+0.5f) \leq 0.9$, $0.1 \leq d/(c'+d+0.5g) \leq 0.9$, $0.01 \leq f/(p+q+0.5f) \leq 0.05$ and $0.01 \leq g/(c'+d+0.5g) \leq 0.05$ and either of f and g is 0.

10. A film adhesive according to claim 1, wherein the polyimide resin is composed by using, as the acid components, p moles of 3,3',4,4'-biphenyltetracarboxylic acid dianhydride and q moles of 3,3',4,4'-benzophenonetetracarboxylic acid dianhydride and, as the amine components, c moles of α,ω-bis(3-aminopropyl)polydimethylsiloxane, c' moles of 2,2-bis(4-(4-aminophenoxy)phenyl)propane and d moles of 1,3-bis(3-aminophenoxy)benzene and/or dimethylphenylenediamine so that the molar ratios of p, q, c, c' and d satisfy $0.5 \leq p/(p+q) \leq 0.9$, $0.1 \leq q/(p+q) \leq 0.5$ and $0.05 \leq c/(c+c'+d) \leq 0.5$.

11. A film adhesive according to claim 1, wherein the polyimide resin is composed of, as the acid components, p moles of 3,3',4,4'-biphenyltetracarboxylic acid dianhydride and q moles of 3,3',4,4'-benzophenonetetracarboxylic acid dianhydride and, as the amine components, c moles of α,ω-bis(3-aminopropyl)polydimethylsiloxane, c' moles of 2,2-bis(4-(4-aminophenoxy)phenyl)propane and d moles of 1,3-bis(3-aminophenoxy)benzene and/or dimethylphenylenediamine, and wherein the polyimide resin is capped, at the molecular ends, with f moles of an acid anhydride represented by general formula (2) or g moles of an aromatic amine represented by general formula (3), and wherein the molar ratios of p, q, c, c', d, f and g satisfy $0.5 \leq p/(p+q+0.5f) \leq 0.9$, $0.1 \leq q/(p+q+0.5f) \leq 0.5$, $0.05 \leq c/(c+c'+d+0.5g) \leq 0.5$, $0.01 \leq f/(p+q+0.5f) \leq 0.05$ and $0.01 \leq g/(c+c'+d+0.5g) \leq 0.05$ and either of f and g is 0.

12. A film adhesive according to claim 1, wherein the polyimide resin is composed of, as the acid components, a moles of 4,4'-oxydiphthalic acid dianhydride and b moles of one or two tetracarboxylic acid dianhydrides selected from the group consisting of 3,3',4,4'-biphenyltetracarboxylic acid dianhydride and 3,3',4,4'-benzophenonetetracarboxylic acid dianhydride and, as the amine components, c moles of α,ω-bis(3-aminopropyl)polydimethylsiloxane, c' moles of 2,2-bis(4-(4-aminophenoxy)phenyl)propane and d moles of 1,3-bis(3-aminophenoxy)benzene and/or dimethylphenylenediamine so that the molar ratios of a, b, c, c' and d satisfy $a/(a+b) \geq 0.6$, $b/(a+b) \leq 0.4$ and $0.05 \leq c/(c+c'+d) \leq 0.5$.

13. A film adhesive according to claim 1, wherein the polyimide resin is composed of, as the acid components, a moles of 4,4'-oxydiphthalic acid dianhydride and b moles of one or two tetracarboxylic acid dianhydrides selected from the group consisting of 3,3',4,4'-biphenyltetracarboxylic acid dianhydride and 3,3',4,4'-benzophenonetetracarboxylic acid dianhydride and, as the amine components, c moles of α,ω-bis(3-aminopropyl)polydimethylsiloxane, c' moles of 2,2-bis(4-(4-aminophenoxy)phenyl)propane and d moles of 1,3-bis(3-aminophenoxy)benzene and/or dimethylphenylenediamine, and wherein the polyimide resin is capped, at the molecular ends, with f moles of an acid anhydride represented by general formula (2) or g moles of an aromatic amine represented by general formula (3), and wherein the molar ratios of a, b, c, c', d, f and g satisfy $a/(a+b+0.5f) \geq 0.6$, $b/(a+b+0.5f) \leq 0.4$, $0.05 \leq c/(c+c'+d+0.5g) \leq 0.5$, $0.01 \leq f/(a+b+0.5f) \leq 0.05$ and $0.01 \leq g/(c+c'+d+0.5g) \leq 0.05$ and either of f and g is 0.

14. A film adhesive comprising a heat-resistant film base and a film adhesive of claim 1, applied on one side or both sides of the film base.

15. A film adhesive according to claim 14, wherein the heat-resistant film base is a polyimide film having a glass transition temperature of 350° C. or higher.

16. A process for producing a film adhesive, which comprises casting, on one side or both sides of a substrate, an organic solvent solution of a polyimide resin having a glass transition temperature of 350° C. or lower and soluble in organic solvents, said polyimide resin being obtained by reacting at least one of the following acid components (A) and (B)

(A) 4,4'-oxydiphthalic acid dianhydride
(B) 3,3',4,4'-biphenyltetracarboxylic acid dianhydride and/or 3,3',4,4'-benzophenonetetracarboxylic acid dianhydride with the following amine components (C) and (D)

(C) a siloxane compound represented by the following general formula (1) and/or 2,2-bis(4-(4-aminophenoxy)phenyl)propane

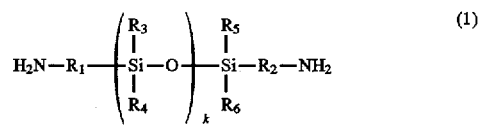

wherein $R_1$ and $R_2$ are each a bivalent aliphatic ($C_{1-4}$) or aromatic group; $R_3$, $R_4$, $R_5$ and $R_6$ are each a mono-valent aliphatic or aromatic group; and k is an integer of 1–20, (D) 1,3-bis(3-aminophenoxy)benzene and/or dimethylphenylene-diamine to give rise to ring closure of imide.

17. A process for producing a film adhesive according to claim 16, wherein the substrate is a polyimide film having a glass transition temperature of 350° C. or higher.

18. A process for producing a film adhesive, which comprises casting, on one side or both sides of a substrate, an organic solvent solution of a polyimide resin having a glass transition temperature of 350° C. or lower and soluble in organic solvents, said polyimide resin being obtained by reacting at least one of the following acid components (A) and (B)

(A) 4,4'-oxydiphthalic acid dianhydride
(B) 3,3',4,4'-biphenyltetracarboxylic acid dianhydride and/or 3,3',4,4'-benzophenonetetracarboxylic acid dianhydride with the following amine components (C) (D)

(C) a siloxane compound represented by the following general formula (1) and/or 2,2-bis(4-(4-aminophenoxy)phenyl)propane

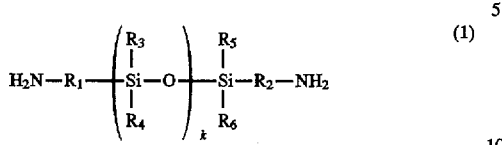

wherein $R_1$ and $R_2$ are each a bivalent aliphatic ($C_{1-4}$) or aromatic group; $R_3$, $R_4$, $R_5$ and $R_6$ are each a mono-valent aliphatic or aromatic group; and k is an integer of 1–20, (D) 1,3-bis(3-aminophenoxy)benzene and/or dimethylphenylene-diamine to give rise to ring closure of imide, and peeling the substrate after casting and drying.

19. A film adhesive comprising, as the main constituent, a polyimide resin having a glass transition temperature of 350° C. or lower and soluble in organic solvents, which polyimide resin is obtained by reacting at least one of the following acid components (A) and (B)

(A) 4,4'-oxydiphthalic acid dianhydride (B) 3,3',4,4'-biphenyltetracarboxylic acid dianhydride and/or 3,3,4-benzophenonetetracarboxylic acid dianhydride with the following amine components (C) and (D)

(C) a siloxane compound represented by the following general formula (1)

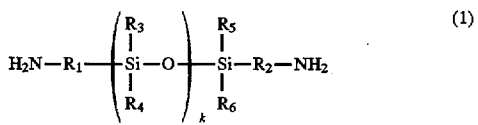

wherein $R_1$ and $R_2$ are each a bivalent aliphatic ($C_{1-4}$) or aromatic group; $R_3$, $R_4$, $R_5$ and $R_6$ are each a mono-valent aliphatic or aromatic group; and k is an integer of 1–20, (D) 2,2-bis(4-(4-amino-phenoxy)phenyl)propane and/or 1,3-bis(3-aminophenoxy)benzene and/or dimethylphenylene-diamine to give rise to ring closure of imide.

20. A process for producing a film adhesive, which comprises casting, on one side or both sides of a substrate, an organic solvent solution of a polyimide resin having a glass transition temperature of 350° C. or lower and soluble in organic solvents, said polyimide resin being obtained by reacting at least one of the following acid components (A) and (B)

(A) 4,4'-oxydiphthalic acid dianhydride (B) 3,3',4,4'-biphenyltetracarboxylic acid dianhydride and/or 3,3',4,4'-benzophenonetetracarboxylic acid dianhydride with the following amine components (C) and (D)

(C) a siloxane compound represented by the following general formula (1)

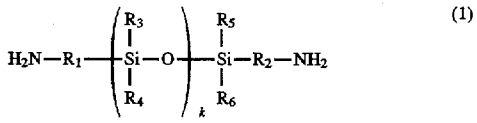

wherein $R_1$ and $R_2$ are each a bivalent aliphatic ($C_{1-4}$) or aromatic group; $R_3$, $R_4$, $R_5$ and $R_6$ are each a mono-valent aliphatic or aromatic group; and k is an integer of 1–20, (D) 2,2-bis(4-(4-amino-phenoxy)phenyl)propane and/or 1,3-bis(3-aminophenoxy)benzene and/or dimethylphenylene-diamine to give rise to ring closure of imide.

21. A film adhesive according to claim 19, wherein polyimide resin is capped, at the molecular ends, with an acid anhydride represented by the following general formula (2) or an aromatic amine represented by the following general formula (3):

(X is at least one group selected from

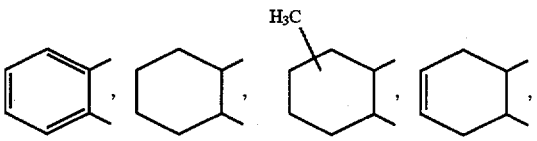

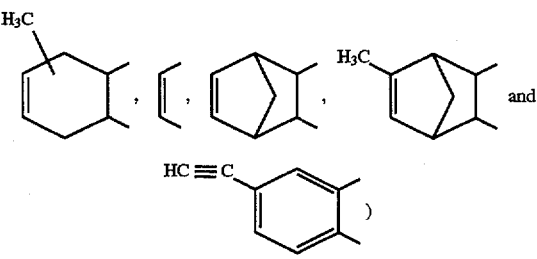

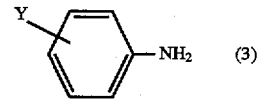

wherein Y is at least one group selected from hydrogen, methyl, ethyl, propyl, butyl, phenyl, methoxy, ethoxy, propoxy, butoxy and phenoxy groups.

22. A process for producing a film adhesive according to claim 24, wherein the polyimide resin is capped, at the molecular ends, with an acid anhydride represented by the following general formula (2) or an aromatic amine represented by the following general formula (3):

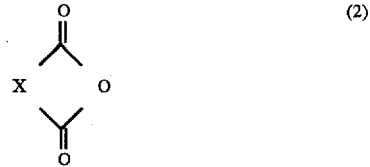

(X is at least one group selected from

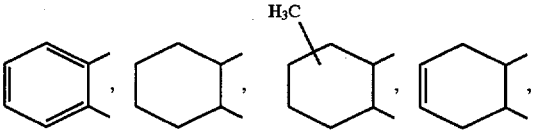

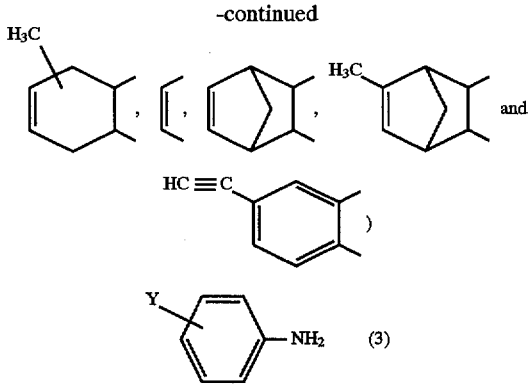

$$Y \underset{\phantom{xx}}{\overset{\phantom{xx}}{\text{—}}} NH_2 \quad (3)$$

wherein Y is at least one group selected from hydrogen, methyl, ethyl, propyl, butyl, phenyl, methoxy, ethoxy, propoxy, butoxy and phenoxy groups.

23. A film adhesive according to claim 19, wherein the polyimide resin is composed by using the acid component (A) 4,4'-oxydiphthalic acid dianhydride in an amount of 60 mole % or more based on the total amount of the acid components.

24. A film adhesive according to claim 19, wherein the polyimide resin is composed by using, as the acid component (B), p moles of 3,3',4,4'-biphenyltetracarboxylic acid dianhydride and q moles of 3,3',4,4'-benzophenonetetracarboxylic acid dianhydride in proportions satisfying $0.5 \leq p/(p+q) \leq 0.9$.

25. A film adhesive according to claim 19, wherein the polyimide resin is composed by using, as the amine component (C), a siloxane compound represented by general formula (1) in an amount of 5–60 mole % based on the total amount of the amine components.

26. A film adhesive according to claim 19, wherein the polyimide resin is composed by using, as the amine component (D), 1,3-bis(3-aminophenoxy)benzene in an amount of 10–90 mole % based on the total amount of the amine components.

27. A film adhesive according to claim 19, wherein the polyimide resin is composed by using, as the acid components, a moles of 4,4'-oxydiphthalic acid dianhydride and b moles of another tetracarboxylic acid dianhydride and, as the amine components, c moles of α,ω-bis(3-aminopropyl)polydimethylsiloxane, d moles of 1,3-bis(3-aminophenoxy)benzene and/or dimethylphenylenediamine and e moles of another diamine in proportions satisfying $a/(a+b) \geq 0.6$, $0.6 > b/(a+b) \geq 0$, $0.1 \leq c/(c+d+e) \leq 0.6$, $0.6 \leq (c+d)/(c+d+e)$, $0 \leq e/(c+d+e) < 0.6$ and $0.950 < (a+b)/(c+d+e) < 1.02$.

28. A film adhesive according to claim 19, wherein the polyimide resin is composed of, as the acid components, a moles of 4,4'-oxydiphthalic acid dianhydride and b moles of another tetracarboxylic acid dianhydride and, as the amine components, c moles of α,ω-bis(3-aminopropyl)polydimethylsiloxane, d moles of 1,3-bis(3-aminophenoxy)benzene and/or dimethylphenylenediamine and e moles of another diamine, and wherein the polyimide resin is capped, at the molecular ends, with f moles of an acid anhydride represented by general formula (2) or g moles of an aromatic amine represented by general formula (3), and wherein the molar ratios of a, b, c, d, e, f and g satisfy $0.6 \leq a/(a+b+0.5f)$, $0 \leq b/(a+b+0.5f) < 0.6$, $0.1 \leq c/(c+d+e+0.5g) \leq 0.6$, $0 \leq e/(c+d+e+0.5g) < 0.6$, $0.01 \leq f/(a+b+0.5f) \leq 0.05$ and $0.01 \leq g/(c+d+e+0.5g) \leq 0.05$ and either of f and g is 0.

29. A film adhesive according to claim 19, wherein the polyimide resin is composed by using, as the acid components, p moles of 3,3',4,4'-biphenyltetracarboxylic acid dianhydride and q moles of 3,3',4,4'-benzophenonetetracarboxylic acid dianhydride and, as the amine components, c' moles of 2,2-bis(4-(4-aminophenoxy)phenyl)propane and d moles of 1,3-bis(3-aminophenoxy)benzene in proportions satisfying $0.5 \leq p/(p+q) \leq 0.9$ and $0.1 \leq d/(c'+d) \leq 0.9$.

30. A film adhesive according to claim 19, wherein the polyimide resin is composed of, as the acid components, p moles of 3,3',4,4'-biphenyltetracarboxylic acid dianhydride and q moles of 3,3',4,4'-benzophenonetetracarboxylic acid dianhydride and, as the amine components, c' moles of 2,2-bis(4-(4-aminophenoxy)phenyl)propane and d moles of 1,3-bis(3-aminophenoxy)benzene, and wherein the polyimide resin is capped, at the molecular ends, with f moles of an acid anhydride represented by general formula (2) or g moles of an aromatic amine represented by general formula (3), and wherein the molar ratios of p, q, c', d, f and g satisfy $0.5 \leq p/(p+q+0.5f) \leq 0.9$, $0.1 \leq d/(c'+d+0.5g) \leq 0.9$, $0.01 \leq f/(p+q+0.5f) \leq 0.05$ and $0.01 \leq g/(c'+d+0.5g) \leq 0.05$ and either of f and g is 0.

31. A film adhesive according to claim 19, wherein the polyimide resin is composed by using, as the acid components, p moles of 3,3',4,4'-biphenyltetracarboxylic acid dianhydride and q moles of 3,3',4,4'-benzophenonetetracarboxylic acid dianhydride and, as the amine components, c moles of α,ω-bis(3-aminopropyl)polydimethylsiloxane, c' moles of 2,2-bis(4-(4-aminophenoxy)phenyl)propane and d moles of 1,3-bis(3-aminophenoxy)benzene and/or dimethylphenylenediamine so that the molar ratios of p, q, c, c' and d satisfy $0.5 \leq p/(p+q) \leq 0.9$, $0.1 \leq q/(p+q) \leq 0.5$ and $0.05 \leq c/(c+c'+d) \leq 0.5$.

32. A film adhesive according to claim 19, wherein the polyimide resin is composed of, as the acid components, p moles of 3,3',4,4'-biphenyltetracarboxylic acid dianhydride and q moles of 3,3',4,4'-benzophenonetetracarboxylic acid dianhydride and, as the amine components, c moles of α,ω-bis(3-aminopropyl)polydimethylsiloxane, c' moles of 2,2-bis(4-(4-aminophenoxy)phenyl)propane and d moles of 1,3-bis(3-aminophenoxy)benzene and/or dimethylphenylenediamine, and wherein the polyimide resin is capped, at the molecular ends, with f moles of an acid anhydride represented by general formula (2) or g moles of an aromatic amine represented by general formula (3), and wherein the molar ratios of p, q, c, c', d, f and g satisfy $0.5 \leq p/(p+q+0.5f) \leq 0.9$, $0.1 \leq q/(p+q+0.5f) \leq 0.5$, $0.05 \leq c/(c+c'+d+0.5g) \leq 0.5$, $0.01 \leq f/(p+q+0.5f) \leq 0.05$ and $0.01 \leq g/(c+c'+d+0.5g) \leq 0.05$ and either of f and g is 0.

33. A film adhesive according to claim 19, wherein the polyimide resin is composed of, as the acid components, a moles of 4,4'-oxydiphthalic acid dianhydride and b moles of one or two tetracarboxylic acid dianhydrides selected from the group consisting of 3,3',4,4'-biphenyltetracarboxylic acid dianhydride and 3,3',4,4'-benzophenonetetracarboxylic acid dianhydride and, as the amine components, c moles of α,ω-bis(3-aminopropyl)polydimethylsiloxane, c' moles of 2,2-bis(4-(4-aminophenoxy)phenyl)propane and d moles of 1,3-bis(3-aminophenoxy)benzene and/or dimethylphenylenediamine so that the molar ratios of a, b, c, c' and d satisfy $a/(a+b) \geq 0.6$, $b/(a+b) \leq 0.4$ and $0.05 \leq c/(c+c'+d) \leq 0.5$.

34. A film adhesive according to claim 19, wherein the polyimide resin is composed of, as the acid components, a moles of 4,4'-oxydiphthalic acid dianhydride and b moles of one or two tetracarboxylic acid dianhydrides selected from the group consisting of 3,3',4,4'-biphenyltetracarboxylic acid dianhydride and 3,3',4,4'-benzophenonetetracarboxylic acid dianhydride and, as the amine components, c moles of α,ω-bis(3-aminopropyl)polydimethylsiloxane, c' moles of 2,2-bis(4-(4-aminophenoxy)phenyl)propane and d moles of 1,3-bis(3-aminophenoxy)benzene and/or dimethylphenylenediamine, and wherein the polyimide resin is capped, at the molecular ends, with f moles of an acid anhydride represented by general formula (2) or g moles of an aromatic amine represented by general formula (3), and wherein the molar ratios of a, b, c, c', d, f and g satisfy a/(a+b+0.5f)≧0.6, b/(a+b+0.5f)≦0.4, 0.05≦c/(c+c'+d+0.5g)≦0.5, 0.01≦f/(a+b+0.5f)≦0.05 and 0.01≦g/(c+c'+d+0.5g)≦0.05 and either of f and g is 0.

35. A film adhesive comprising a heat-resistant film base and a film adhesive according to claim 19, applied on one side or both sides of the film base.

36. A film adhesive according to claim 35, wherein the heat-resistant film base is a polyimide film having a glass transition temperature of 350° C. or higher.

37. A process for producing a film adhesive according to claim 20, wherein the substrate is a polyimide film having a glass transition temperature of 350° C. or higher.

38. A process for producing a film adhesive according to claim 20, which comprises peeling the substrate after casting and drying.

39. A process according to claim 38 wherein the substrate is a biaxially stretched polyester film.

40. A process for producing a film adhesive according to claim 20, which comprises casting said polyimide resin solution on a substrate by use of an organic solvent having a boiling point of 180° C. or lower, drying the cast polyimide resin solution and peeling the dried polyimide resin from the substrate.

41. A film adhesive according to claim 21, wherein the polyimide resin is composed by using the acid component (A), 4,4'-oxydiphthalic acid dianhydride in an amount of 60 mole % or more based on the total amount of the acid components.

42. A film adhesive according to claim 21, wherein the polyimide resin is composed by using, as the acid component (B), p moles of 3,3',4,4'-biphenyltetracarboxylic acid dianhydride and q moles of 3,3',4,4'-benzophenonetetracarboxylic acid dianhydride in proportions satisfying 0.5≦p/(p+q)≦0.9.

43. A film adhesive according to claim 21, wherein the polyimide resin is composed by using, as the amine component (C), a siloxane compound represented by general formula (1) in an amount of 5–60 mole % based on the total amount of the amine components.

44. A film adhesive according to claim 21, wherein the polyimide resin is composed by using, as the amine component (D), 1,3-bis(3-aminophenoxy)benzene in an amount of 10–90mole % based on the total amount of the amine components.

45. A film adhesive according to claim 21, wherein the polyimide resin is composed by using, as the acid components, a moles of 4,4'-oxydiphthalic acid dianhydride and b moles of another tetracarboxylic acid dianhydride and, as the amine components, c moles of α,ω-bis(3-aminopropyl)polydimethylsiloxane, d moles of 1,3-bis(3-aminophenoxy)benzene and/or dimethylphenylenediamine and e moles of another diamine in proportions satisfying a/(a+b)≧0.6, 0.6>b/(a+b)≧0, 0.1≦c/(c+d+e)≦0.6, 0.6≦(c+d)/(c+d+e), 0≦e/(c+d+e)<0.6 and 0.950<(a+b)/(c+d+e)<1.02.

46. A film adhesive according to claim 21, wherein the polyimide resin is composed of, as the acid components, a moles of 4,4'-oxydiphthalic acid dianhydride and b moles of another tetracarboxylic acid dianhydride and, as the amine components, c moles of α,ω-bis(3-aminopropyl)polydimethylsiloxane, d moles of 1,3-bis(3-aminophenoxy)benzene and/or dimethylphenylenediamine and e moles of another diamine, and wherein the polyimide resin is capped, at the molecular ends, with f moles of an acid anhydride represented by general formula (2) or g moles of an aromatic amine represented by general formula (3), and wherein the molar ratios of a, b, c, d, e, f and g satisfy 0.6≦a/(a+b+0.5f), 0≦b/(a+b+0.5g)<0.6, 0.1≦c/(c+d+e+0.5g)≦0.6, 0≦e/(c+d+e+0.5g)<0.1, 0.01≦f/(a+b+0.5f)≦0.05 and 0.01≦g/(c+d+e+0.5g)≦0.05 and either of f and g is 0.

47. A film adhesive according to claim 21, wherein the polyimide resin is composed by using, as the acid components, p moles of 3,3',4,4'-biphenyltetracarboxylic acid dianhydride and q moles of 3',3',4,4'-benzophenonetetracarboxylic acid dianhydride and, as the amine components, c' moles of 2,2-bis(4-(4-aminophenoxy)phenyl)propane and d moles of 1,3-bis(3-aminophenoxy)benzene in proportions satisfying 0.5≦p/(p+q)≦0.9 and 0.1≦d/(c'+d)≦0.9.

48. A film adhesive according to claim 21, wherein the polyimide resin is composed of, as the acid components, p moles of 3,3',4,4'-biphenyltetracarboxylic acid dianhydride and q moles of 3,3',4,4'-benzophenonetetracarboxylic acid dianhydride and, as the amine components, c' moles of 2,2-bis(4-(4-aminophenoxy)phenyl)propane and d moles of 1,3-bis(3-aminophenoxy)benzene, and wherein the polyimide resin is capped, at the molecular ends, with f moles of an acid anhydride represented by general formula (2) or g moles of an aromatic amine represented by general formula (3), and wherein the molar ratios of p, q, c', d, f and g satisfy 0.5≦p/(p+q+0.5f)≦0.9, 0.1≦d/(c'+d+0.5g)≦0.9, 0.01≦f/(p+q+0.5f)≦0.05 and 0.01≦g/(c'+d+0.5g)≦0.05 and either of f and g is 0.

49. A film adhesive according to claim 21, wherein the polyimide resin is composed by using, as the acid components, p moles of 3,3',4,4'-biphenyltetracarboxylic acid dianhydride and q moles of 3,3',4,4'-benzophenonetetracarboxylic acid dianhydride and, as the amine components, c moles of α,ω-bis(3-aminopropyl)polydimethylsiloxane, c' moles of 2,2-bis(4-(4-aminophenoxy)phenyl)propane and d moles of 1,3-bis(3-aminophenoxy)benzene and/or dimethylphenylenediamine so that the molar ratios of p, q, c, c' and d satisfy 0.5≦p/(p+q)≦0.9, 0.1≦q/(p+q)≦0.5 and 0.05≦c/(c+c'+d)≦0.5.

50. A film adhesive according to claim 21, wherein the polyimide resin is composed of, as the acid components, p moles of 3,3',4,4'-biphenyltetracarboxylic acid dianhydride and q moles of 3,3',4,4'-benzophenonetetracarboxylic acid dianhydride and, as the amine components, c moles of α,ω-bis(3-aminopropyl)polydimethylsiloxane, c' moles of 2,2-bis(4-(4-aminophenoxy)phenyl)propane and d moles of 1,3-bis(3-aminophenoxy)benzene and/or dimethylphenylenediamine, and wherein the polyimide resin is capped, at the molecular ends, with f moles of an acid anhydride represented by general formula (2) or g moles of an aromatic amine represented by general formula (3), and wherein the molar ratios of p, q, c, c', d, f and g satisfy 0.5≦p/(p+q+0.5f)≦0.9, 0.1≦q/(p+q+0.5f)≦0.5, 0.05≦c/(c+c'+d+0.5g)≦0.5, 0.01≦f/(p+q+0.5f)≦0.05 and 0.01≦g/(c+c'+d+0.5g)≦0.05 and either of f and g is 0.

51. A film adhesive according to claim 21, wherein the polyimide resin is composed of, as the acid components, a moles of 4,4'-oxydiphthalic acid dianhydride and b moles of one or two tetracarboxylic acid dianhydrides selected from the group consisting of 3,3',4,4'-biphenyltetracarboxylic acid dianhydride and 3,3',4,4'-benzophenonetetracarboxylic acid dianhydride and, as the amine components, c moles of α,ω-bis(3-aminopropyl)polydimethylsiloxane, c' moles of 2,2-bis(4-(4-aminophenoxy)phenyl)propane and d moles of 1,3-bis(3-aminophenoxy)benzene and/or dimethylphenylenediamine so that the molar ratios of a, b, c, c' and d satisfy a/(a+b)≧0.6, b/(a+b)≦0.4 and 0.05≦c/(c+c'+d)≦0.5.

52. A film adhesive according to claim 21, wherein the polyimide resin is composed of, as the acid components, a moles of 4,4'-oxydiphthalic acid dianhydride and b moles of one or two tetracarboxylic acid dianhydrides selected from the group consisting of 3,3',4,4'-biphenyltetracarboxylic acid dianhydride and 3,3',4,4'-benzophenonetetracarboxylic acid dianhydride and, as the amine components, c moles of α,ω-bis(3-aminopropyl)polydimethylsiloxane, c' moles of 2,2-bis(4-(4-aminophenoxy)phenyl)propane and d moles of 1,3-bis(3-aminophenoxy)benzene and/or dimethylphenylenediamine, and wherein the polyimide resin is capped, at the molecular ends, with f moles of an acid anhydride represented by general formula (2) or g moles of an aromatic amine represented by general formula (3), and wherein the molar ratios of a, b, c, c', d, f and g satisfy a/(a+b+0.5f)≧0.6, b/(a+b+0.5f)≦0.4, 0.05≦c/(c+c'+d+0.5g)≦0.5, 0.01≦f/(a+b+0.5f)≦0.05 and 0.01≦g/(c+c'+d+0.5g)≦0.05 and either of f and g is 0.

53. A film adhesive comprising a heat-resistant base and a film adhesive according to claim 21, applied on one side or both sides of the film base.

54. A film adhesive according to claim 53, wherein the heat-resistant film base is a polyimide film having a glass transition temperature of 350° C. or higher.

55. A process for producing a film adhesive according to claim 22, wherein the substrate is a polyimide film having a glass transition temperature of 350° C. or higher.

56. A process for producing a film adhesive according to claim 22, which comprises peeling the substrate after casting and drying.

57. A process according to claim 56, wherein the substrate is a biaxially stretched polyester film.

58. A process for producing a film adhesive according to claim 22, which comprises casting said polyimide resin solution on a substrate by use of an organic solvent having a boiling point of 180° C. or lower, drying the cast polyimide resin solution and peeling the dried polyimide resin from the substrate.

59. A film adhesive comprising as the main constituent, a polyimide resin having a glass transition temperature of 350° C. or lower and soluble in organic solvents, which polyimide resin is obtained by reacting at least one of the following acid components (A) and (B)

(A) 4,4'-oxydiphthalic acid dianhydride (B) 3,3',4,4'-biphenyltetracarboxylic acid dianhydride and/or 3,3',4,4'-benzophenonetetracarboxylic acid dianhydride with at least one of the following amine components (C) and (D)

(C) a siloxane compound represented by the following general formula (1) and/or 2,2-bis(4-(4-aminophenoxy)phenyl)propane

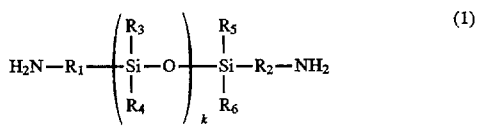

wherein $R_1$ and $R_2$ are each a bivalent aliphatic ($C_{1-4}$) or aromatic group; $R_3$, $R_4$, $R_5$ and $R_6$ are each a mono-valent aliphatic or aromatic group; and k is an integer of 1–20, (D) bis(aminophenoxy)benzene and/or dimethylphenylene-diamine to give rise to ring closure of imide, and wherein the polyimide resin is capped, at the molecular ends, with an acid anhydride represented by the following general formula (2) or an aromatic amine represented by the following general formula (3):

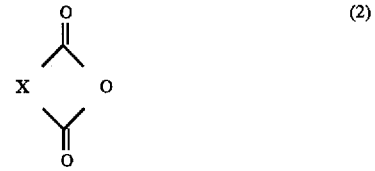

(X is at least one group selected from

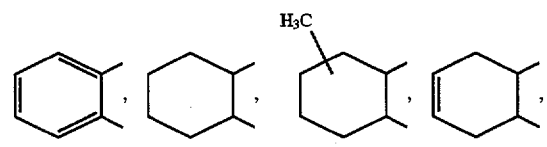

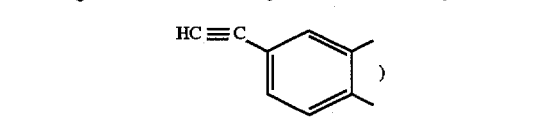

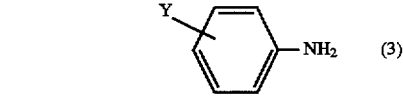

wherein Y is at least one group selected from hydrogen, methyl, ethyl, propyl, butyl, phenyl, methoxy, ethoxy, propoxy, butoxy and phenoxy groups.

60. A film adhesive according to claim 59, wherein the polyimide resin is composed by using the acid component (A) 4,4'-oxydiphthalic acid dianhydride in an amount of 60 mole % or more based on the total amount of the acid components.

61. A film adhesive according to claim 59, wherein the polyimide resin is composed by using, as the acid component (B), p moles of 3,3',4,4'-biphenyltetracarboxylic acid dianhydride and q moles of 3,3',4,4'-benzophenonetetracarboxylic acid dianhydride in proportions satisfying 0.5≦p/(p+q)≦0.9.

62. A film adhesive according to claim 59, wherein the polyimide resin is composed by using, as the amine component (C), a siloxane compound represented by general formula (1) in an amount of 5–60 mole % based on the total amount of the amine components.

63. A film adhesive according to claim 59, wherein the polyimide resin is composed by using, as the amine component (D), 1,3-bis(3-aminophenoxy)benzene in an amount of 10–90 mole % based on the total amount of the amine components.

64. A film adhesive according to claim 59, wherein the polyimide resin is composed by using, as the acid components, a moles of 4,4'-oxydiphthalic acid dianhydride and b moles of another tetracarboxylic acid dianhydride and, as the amine components, c moles of α,ω-bis(3-aminopropyl)polydimethylsiloxane, d moles of 1,3-bis(3-aminophenoxy)benzene and/or dimethylphenylenediamine and e moles of another diamine in proportions satisfying a/(a+b)≧0.6, 0.6>b/(a+b)≧0, 0.1≦c/(c+d+e)≦0.6, 0.6≦(c+d)/(c+d+e), 0≦e/(c+d+e)<0.6 and 0.950<(a+b)/(c+d+e)<1.02.

65. A film adhesive according to claim 59, wherein the polyimide resin is composed of, as the acid components, a moles of 4,4'-oxydiphthalic acid dianhydride and b moles of another tetracarboxylic acid dianhydride and, as the amine components, c moles of α,ω-bis(3-aminopropyl)polydimethylsiloxane, d moles of 1,3-bis(3-aminophenoxy)benzene and/or dimethylphenylenediamine and e moles of another diamine, and wherein the polyimide resin is capped, at the molecular ends, with f moles of an acid anhydride represented by general formula (2) or g moles of an aromatic amine represented by general formula (3), and wherein the molar ratios of a, b, c, d, e, f and g satisfy 0.6≦a/(a+b+0.5f), 0≦b/(a+b+0.5f)<0.6, 0.1≦c/(c+d+e+0.5g)≦0.6, 0≦e/(c+d+e+0.5g)<0.6, 0.01≦f/(a+b+0.5f)≦0.05 and 0.01≦g/(c+d+e+0.5g)≦0.05 and either of f and g is 0.

66. A film adhesive according to claim 59, wherein the polyimide resin is composed by using, as the acid components, p moles of 3,3',4,4'-biphenyltetracarboxylic acid dianhydride and q moles of 3,3',4,4'-benzophenonetetracarboxylic acid dianhydride and, as the amine components, c' moles of 2,2-bis(4-(4-aminophenoxy)phenyl)propane and d moles of 1,3-bis(3-aminophenoxy)benzene in proportions satisfying 0.5≦p/(p+q)≦0.9 and 0.1≦d/(c'+d)≦0.9.

67. A film adhesive according to claim 59, wherein the polyimide resin is composed of, as the acid components, p moles of 3,3',4,4'-biphenyltetracarboxylic acid dianhydride and q moles of 3,3',4,4'-benzophenonetetracarboxylic acid dianhydride and, as the amine components, c' moles of 2,2-bis(4-(4-aminophenoxy)phenyl)propane and d moles of 1,3-bis(3-aminophenoxy)benzene, and wherein the polyimide resin is capped, at the molecular ends, with f moles of an acid anhydride represented by general formula (2) or g moles of an aromatic amine represented by general formula (3), and wherein the molar ratios of p, q, c', d, f and g satisfy 0.5≦p/(p+q+0.5f)≦0.9, 0.1≦d/(c'+d+0.5g)≦0.9, 0.01≦f/(p+q+0.5f)≦0.05 and 0.01≦g/(c'+d+0.5g)≦0.05 and either of f and g is 0.

68. A film adhesive according to claim 59, wherein the polyimide resin is composed by using, as the acid components, p moles of 3,3',4,4'-biphenyltetracarboxylic acid dianhydride and q moles of 3,3',4,4'-benzophenonetetracarboxylic acid dianhydride and, as the amine components, c moles of α,ω-bis(3-aminopropyl)polydimethylsiloxane, c' moles of 2,2-bis(4-(4-aminophenoxy)phenyl)propane and d moles of 1,3-bis(3-aminophenoxy)benzene and/or dimethylphenylenediamine so that the molar ratios of p, q, c, c' and d satisfy 0.5≦p/(p+q)≦0.9, 0.1≦q/(p+q)≦0.5 and 0.05≦c/(c+c'+d)≦0.5.

69. A film adhesive according to claim 59, wherein the polyimide resin is composed of, as the acid components, p moles of 3,3',4,4'-biphenyltetracarboxylic acid dianhydride and q moles of 3,3',4,4'-benzophenonetetracarboxylic acid dianhydride and, as the amine components, c moles of α,ω-bis(3-aminopropyl)polydimethylsiloxane, c' moles of 2,2-bis(4-(4-aminophenoxy)phenyl)propane and d moles of 1,3-bis(3-aminophenoxy)benzene and/or dimethylphenylenediamine, and wherein the polyimide resin is capped, at the molecular ends, with f moles of an acid anhydride represented by general formula (2) or g moles of an aromatic amine represented by general formula (3), and wherein the molar ratios of p, q, c, c', d, f and g satisfy 0.5≦p/(p+q+0.5f)≦0.9, 0.1≦q/(p+q+0.5f)≦0.5, 0.05≦c/(c+c'+d+0.5g)≦0.5, 0.01≦f/(p+q+0.5f)≦0.05 and 0.01≦g/(c+c'+d+0.5g)≦0.05 and either of f and g is 0.

70. A film adhesive according to claim 59, wherein the polyimide resin is composed of, as the acid components, a moles of 4,4'-oxydiphthalic acid dianhydride and b moles of one or two tetracarboxylic acid dianhydrides selected from the group consisting of 3,3',4,4'-biphenyltetracarboxylic acid dianhydride and 3,3',4,4'-benzophenonetetracarboxylic acid dianhydride and, as the amine components, c moles of α,ω-bis(3-aminopropyl)polydimethylsiloxane, c' moles of 2,2-bis(4-(4-aminophenoxy)phenyl)propane and d moles of 1,3-bis(3-aminophenoxy)benzene and/or dimethylphenylenediamine so that the molar ratios of a, b, c, c' and d satisfy a/(a+b)≧0.6, b/(a+b)≦0.4 and 0.05≦c/(c+c'+d)≦0.5.

71. A film adhesive according to claim 59, wherein the polyimide resin is composed of, as the acid components, a moles of 4,4'-oxydiphthalic acid dianhydride and b moles of one or two tetracarboxylic acid dianhydrides selected from the group consisting of 3,3',4,4'-biphenyltetracarboxylic acid dianhydride and 3,3',4,4'-benzophenonetetracarboxylic acid dianhydride and, as the amine components, c moles of α,ω-bis(3-aminopropyl)polydimethylsiloxane, c' moles of 2,2-bis(4-(4-aminophenoxy)phenyl)propane and d moles of 1,3-bis(3-aminophenoxy)benzene and/or dimethylphenylenediamine, and wherein the polyimide resin is capped, at the molecular ends, with f moles of an acid anhydride represented by general formula (2) or g moles of an aromatic amine represented by general formula (3), and wherein the molar ratios of a, b, c, c', d, f and g satisfy a/(a+b+0.5f)≧0.6, b/(a+b+0.5f)≦0.4, 0.05≦c/(c+c'+d+0.5g)≦0.5, 0.01≦f/(a+b+0.5f)≦0.05 and 0.01≦g/(c+c'+d+0.5g)≦0.05 and either of f and g is 0.

72. A film adhesive comprising a heat-resistant film base and a film adhesive according to claim 59, applied on one side or both sides of the film base.

73. A film adhesive according to claim 72, wherein the heat-resistant film base is a polyimide film having a glass transition temperature of 350° C. or higher.

74. A process for producing a film adhesive, which comprises casting, on one side or both sides of a substrate, an organic solvent solution of a polyimide resin having a glass transition temperature of 350° C. or lower and soluble in organic solvents, said polyimide resin being obtained by reacting at least one of the following acid components (A) and (B)

(A) 4,4'-oxydiphthalic acid dianhydride (B) 3,3',4,4'-biphenyltetracarboxylic acid dianhydride and/or 3,3',4,4'-benzophenonetetracarboxylic acid dianhydride with at least one of the following amine components (C) and (D)

(C) a siloxane compound represented by the following general formula (1) and/or 2,2-bis(4-(4-aminophenoxy)phenyl)propane

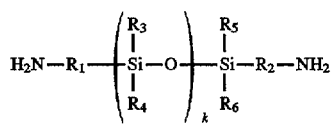

wherein $R_1$ and $R_2$ are each a bivalent aliphatic ($C_{1-4}$) or aromatic group; $R_3$, $R_4$, $R_5$ and $R_6$ are each a mono-valent aliphatic or aromatic group; and k is an integer of 1–20, (D) bis(aminophenoxy)benzene and/or dimethylphenylene-diamine to give rise to ring closure of imide, and wherein the polyimide resin is capped, at the molecular ends, with an acid anhydride represented by the following general formula (2) or an aromatic amine represented by the following general formula (3):

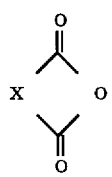

(X is at least one group selected from

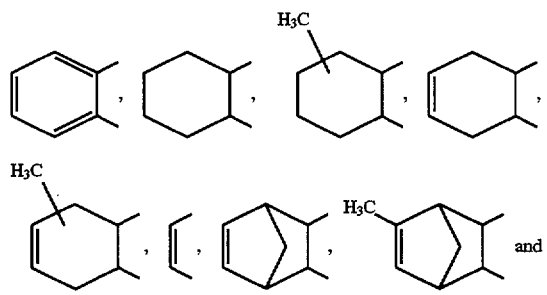

wherein Y is at least one group selected from hydrogen atom and methyl, ethyl, propyl, butyl, phenyl, methoxy, ethoxy, propoxy, butoxy and phenoxy groups.

75. A process for producing a film adhesive according to claim 74, wherein the substrate is a polyimide film having a glass transition temperature of 350° C. or higher.

76. A process for producing a film adhesive according to claim 74, which comprises peeling the substrate after casting and drying.

77. A process according to claim 76, wherein the substrate is a biaxially stretched polyester film.

78. A process for producing a film adhesive according to claim 74, which comprises casting said polyimide resin solution on a substrate by use of an organic solvent having a boiling point of 180° C. or lower, drying the cast polyimide resin solution and peeling the dried polyimide resin from the substrate.

79. A process according to claim 18, wherein the substrate is a biaxially stretched polyester film.

80. A process for producing a film adhesive according to claim 18, wherein said organic solvent solution of said polyamide is in an organic solvent having a boiling point of 180° C. or lower.

* * * * *